(12) United States Patent
Arnold et al.

(10) Patent No.: US 10,276,041 B2
(45) Date of Patent: Apr. 30, 2019

(54) DETECTING ROADWAY TARGETS ACROSS BEAMS

(71) Applicant: Wavetronix LLC, Provo, UT (US)

(72) Inventors: David V. Arnold, Provo, UT (US); Bryan R. Jarrett, Pleasant Grove, UT (US); Thomas W. Karlinsey, American Fork, UT (US); Jonathan L. Waite, Orem, UT (US); Brad Giles, American Fork, UT (US); Randy St. John, Spanish Fork, UT (US)

(73) Assignee: Wavetronix LLC, Provo, UT (US)

( * ) Notice: Subject to any disclaimer, the term of this patent is extended or adjusted under 35 U.S.C. 154(b) by 0 days.

(21) Appl. No.: 15/928,616

(22) Filed: Mar. 22, 2018

(65) Prior Publication Data

US 2018/0211525 A1 Jul. 26, 2018

Related U.S. Application Data

(60) Continuation of application No. 15/187,508, filed on Jun. 20, 2016, now Pat. No. 10,049,569, which is a
(Continued)

(51) Int. Cl.
*G08G 1/08* (2006.01)
*G01S 13/48* (2006.01)
(Continued)

(52) U.S. Cl.
CPC .............. *G08G 1/08* (2013.01); *G01S 13/48* (2013.01); *G01S 13/726* (2013.01); *G01S 13/91* (2013.01); *G08G 1/04* (2013.01)

(58) Field of Classification Search
CPC .. G08G 1/08; G08G 1/04; G08S 13/48; G08S 13/726; G10S 13/91
(Continued)

(56) References Cited

U.S. PATENT DOCUMENTS 3,727,218 A * 4/1973 Cantwell, Jr. ......... G01S 7/2925
342/147
3,737,857 A 6/1973 Carman
(Continued)

FOREIGN PATENT DOCUMENTS

CA 2512689 7/2004
DE 3414159 10/1985
(Continued)

OTHER PUBLICATIONS

Able, K.P., "A Radar Study of the Altitude of Nocturnal Passerine Migration," *Bird-Banding*, vol. 41, No. 4, Oct. 1970, 9 pages.
(Continued)

*Primary Examiner* — Ojiako K Nwugo
(74) *Attorney, Agent, or Firm* — Workman Nydegger

(57) ABSTRACT

The present invention extends to methods, systems, and computer program products for detecting targets across beams at roadway intersections. Embodiments of the invention include tracking a target across a plurality of beams of a multiple beam radar system in a roadway intersection and updating track files for targets within a roadway intersection. Returns from a plurality of radar beams monitoring a roadway intersection are divided into range bins. Identified energy in the range bins is used to compute the position of targets within a roadway intersection. When the position of a target is computed, it is determined if the position is a new position for an existing target or if the position is the position of a new target.

23 Claims, 12 Drawing Sheets

Related U.S. Application Data division of application No. 14/164,102, filed on Jan. 24, 2014, now Pat. No. 9,240,125, which is a continuation of application No. 12/710,736, filed on Feb. 23, 2010, now Pat. No. 8,665,113, which is a continuation-in-part of application No. 11/614,250, filed on Dec. 21, 2006, now Pat. No. 7,889,097, and a continuation-in-part of application No. 12/502,965, filed on Jul. 14, 2009, now Pat. No. 8,248,272, which is a continuation-in-part of application No. 11/264,339, filed on Oct. 31, 2005, now Pat. No. 7,573,400.

(60) Provisional application No. 61/185,005, filed on Jun. 8, 2009.

(51) Int. Cl.
*G01S 13/72* (2006.01)
*G01S 13/91* (2006.01)
*G08G 1/04* (2006.01)

(58) Field of Classification Search
USPC ............... 340/907, 916, 917, 933, 941–943;
343/700 MS; 342/104, 118, 147
See application file for complete search history.

(56) References Cited

U.S. PATENT DOCUMENTS

| | | | |
|---|---|---|---|
| 3,819,919 A | 6/1974 | McGunigle | |
| 3,868,685 A * | 2/1975 | Wilmot | G01S 7/2925 342/147 |
| 4,053,741 A | 10/1977 | Ainoya | |
| 4,167,330 A | 9/1979 | Haville | |
| 4,180,817 A | 12/1979 | Sanford | |
| 4,244,026 A | 1/1981 | Dickey | |
| 4,258,351 A | 3/1981 | Shigeta | |
| 4,317,117 A | 2/1982 | Chasek | |
| RE31,044 E | 9/1982 | McReynolds et al. | |
| 4,370,718 A | 1/1983 | Chasek | |
| 4,430,636 A | 2/1984 | Bruce | |
| 4,658,334 A | 4/1987 | McSparran | |
| 4,659,982 A | 4/1987 | Van de Velde | |
| 4,674,073 A | 6/1987 | Naruse | |
| 4,700,191 A | 10/1987 | Mano | |
| 4,814,765 A | 3/1989 | DeRoche | |
| 4,851,855 A | 7/1989 | Tsukamoto | |
| 4,866,438 A | 9/1989 | Knisch | |
| 4,908,615 A | 3/1990 | Bayraktaroglu | |
| 4,914,448 A | 4/1990 | Otsuka | |
| 4,914,449 A | 4/1990 | Fukuzawa | |
| 4,967,201 A | 10/1990 | Rich | |
| 4,977,406 A | 12/1990 | Tsukamoto | |
| 4,985,705 A | 1/1991 | Stammler | |
| 5,008,678 A | 4/1991 | Herman | |
| 5,023,551 A | 6/1991 | Kleinberg et al. | |
| 5,066,950 A | 11/1991 | Schweitzer | |
| 5,122,961 A | 6/1992 | Toyama | |
| 5,161,107 A * | 11/1992 | Mayeaux | G06K 9/00785 340/937 |
| 5,204,682 A * | 4/1993 | Beasley | G01S 13/60 342/117 |
| 5,243,528 A | 9/1993 | Lefebvre | |
| 5,262,783 A | 11/1993 | Philpott | |
| 5,278,554 A | 1/1994 | Marton | |
| 5,278,563 A | 1/1994 | Spiess | |
| 5,339,081 A | 8/1994 | Jefferis | |
| 5,402,346 A | 3/1995 | Lion | |
| 5,423,080 A * | 6/1995 | Perret | H05K 1/0218 455/300 |
| 5,446,395 A | 8/1995 | Goto | |
| 5,448,484 A | 9/1995 | Bullock | |
| 5,504,490 A | 4/1996 | Brendle | |
| 5,504,659 A | 4/1996 | Acatay | |
| 5,506,584 A | 4/1996 | Boles | |
| 5,510,990 A | 4/1996 | Hibino | |
| 5,555,036 A * | 9/1996 | Harnett | G01S 11/06 340/933 |
| 5,572,450 A | 11/1996 | Worthy | |
| 5,581,249 A * | 12/1996 | Yoshida | G07B 15/063 235/384 |
| 5,621,645 A * | 4/1997 | Brady | G08G 1/04 340/903 |
| 5,663,720 A | 9/1997 | Weissman | |
| 5,668,739 A | 9/1997 | League | |
| 5,694,134 A * | 12/1997 | Barnes | H01G 7/06 333/161 |
| 5,710,565 A | 1/1998 | Shirai | |
| 5,714,965 A | 2/1998 | Taguchi | |
| 5,716,301 A | 2/1998 | Wild | |
| 5,721,194 A | 2/1998 | Yandrofski | |
| 5,748,153 A | 5/1998 | McKinzie | |
| 5,757,307 A * | 5/1998 | Nakatani | G01S 13/42 342/107 |
| 5,790,403 A | 8/1998 | Nakayama | |
| 5,793,309 A | 8/1998 | Nellson | |
| 5,793,491 A | 8/1998 | Wangler | |
| 5,798,983 A | 8/1998 | Kuhn | |
| 5,821,879 A | 10/1998 | Liepmann | |
| 5,828,339 A | 10/1998 | Patel | |
| 5,862,337 A | 1/1999 | Gray | |
| 5,878,367 A | 3/1999 | Lee | |
| 5,884,212 A | 3/1999 | Lion | |
| 5,920,280 A | 7/1999 | Okada | |
| 5,923,280 A | 7/1999 | Farmer | |
| 5,926,114 A | 7/1999 | Andrews | |
| 5,929,802 A | 7/1999 | Russell | |
| 5,962,114 A | 7/1999 | Andrews | |
| 5,949,383 A | 9/1999 | Hayes | |
| 5,995,900 A | 11/1999 | Hsiao | |
| 6,011,515 A | 1/2000 | Radcliffe | |
| 6,037,894 A * | 3/2000 | Pfizenmaier | G01S 7/032 342/128 |
| 6,049,205 A | 4/2000 | Taicher et al. | |
| 6,061,035 A | 5/2000 | Kinasewitz | |
| 6,081,226 A | 6/2000 | Caldwell | |
| 6,085,151 A | 7/2000 | Farmer | |
| 6,091,355 A * | 7/2000 | Cadotte, Jr. | G01S 7/032 342/104 |
| 6,094,172 A | 7/2000 | Kascica | |
| 6,114,973 A | 9/2000 | Winner | |
| 6,118,405 A | 9/2000 | McKinnon | |
| 6,124,807 A | 9/2000 | Heckeroth | |
| 6,160,494 A | 12/2000 | Sodi | |
| 6,163,252 A | 12/2000 | Nishiwaki | |
| 6,177,885 B1 | 1/2001 | Weil | |
| 6,195,019 B1 | 2/2001 | Nagura | |
| 6,195,608 B1 | 2/2001 | Berliner | |
| 6,198,437 B1 | 3/2001 | Watson | |
| 6,204,778 B1 | 3/2001 | Bergan | |
| 6,253,162 B1 | 6/2001 | Jarman | |
| 6,266,627 B1 * | 7/2001 | Gatsonides | G01S 13/582 340/936 |
| 6,272,443 B1 | 8/2001 | Motzko | |
| 6,366,870 B2 | 4/2002 | Jarman | |
| 6,373,427 B1 | 4/2002 | Hohne | |
| 6,377,191 B1 | 4/2002 | Takubo | |
| 6,396,435 B1 | 5/2002 | Fleischhauer | |
| 6,396,437 B1 | 5/2002 | Marino | |
| 6,470,262 B2 | 10/2002 | Kerner | |
| 6,490,519 B1 | 12/2002 | Lapidot | |
| 6,556,916 B2 * | 4/2003 | Waite | G08G 1/0104 340/933 |
| 6,577,269 B2 | 6/2003 | Woodington | |
| 6,614,536 B1 | 9/2003 | Deomens | |
| 6,657,554 B1 | 12/2003 | Terashima | |
| 6,670,910 B2 | 12/2003 | Delcheccolo | |
| 6,683,557 B2 | 1/2004 | Pleva | |
| 6,693,557 B2 * | 2/2004 | Arnold | G01S 13/04 340/928 |
| 6,707,391 B1 | 3/2004 | Monroe | |
| 6,707,419 B2 | 3/2004 | Woodington | |
| 6,750,787 B2 | 6/2004 | Hutchinson | |

(56) References Cited

U.S. PATENT DOCUMENTS

| | | |
|---|---|---|
| 6,781,523 B2 | 8/2004 | Matsui |
| 6,812,888 B2 | 11/2004 | Drury |
| 6,816,107 B2 | 11/2004 | Pleva |
| 6,856,876 B2 | 2/2005 | Breed |
| 6,876,949 B2 * | 4/2005 | Hilliard .................. G08G 1/042 340/941 |
| 6,879,281 B2 | 4/2005 | Gresham |
| 6,888,474 B2 | 5/2005 | Sharp |
| 6,959,259 B2 | 10/2005 | Vock |
| 7,089,422 B2 | 8/2006 | Huntingdon |
| 7,106,073 B1 | 9/2006 | Bach et al. |
| 7,227,493 B2 | 6/2007 | Huntingdon et al. |
| 7,317,406 B2 | 1/2008 | Wolterman |
| 7,324,015 B1 * | 1/2008 | Allen ........................ G08G 1/01 340/933 |
| 7,327,280 B2 | 2/2008 | Bachelder |
| 7,408,479 B2 | 8/2008 | Johnson |
| 7,421,334 B2 | 9/2008 | Dahlgren |
| 7,426,450 B2 * | 9/2008 | Arnold .................. G01S 13/583 702/142 |
| 7,427,930 B2 | 9/2008 | Arnold |
| 7,501,976 B2 | 3/2009 | Manor |
| 7,550,681 B2 | 6/2009 | Wang et al. |
| 7,573,400 B2 | 8/2009 | Arnold |
| 7,821,422 B2 | 10/2010 | Hutchinson et al. |
| 7,889,097 B1 | 2/2011 | Arnold |
| 7,889,098 B1 | 2/2011 | Arnold |
| 7,924,170 B1 | 4/2011 | Arnold |
| 7,991,542 B2 | 8/2011 | Giles |
| 8,248,272 B2 | 8/2012 | Arnold |
| 8,666,113 B2 | 3/2014 | Arnold |
| 8,948,995 B2 | 2/2015 | Pandita et al. |
| 9,240,125 B2 | 1/2016 | Arnold |
| 9,412,271 B2 | 8/2016 | Sharma |
| 9,601,014 B2 | 3/2017 | Arnold et al. |
| 2001/0000948 A1 | 5/2001 | Chen |
| 2001/0045042 A1 | 11/2001 | Theile |
| 2002/0147534 A1 | 10/2002 | Delcheccolo |
| 2003/0212524 A1 | 11/2003 | Cote et al. |
| 2004/0083037 A1 * | 4/2004 | Yamane ................ G08G 1/0104 701/1 |
| 2004/0119633 A1 * | 6/2004 | Oswald .................. G01S 13/931 342/70 |
| 2004/0227661 A1 | 11/2004 | Godsy |
| 2005/0046597 A1 * | 3/2005 | Hutchison ................ G01S 13/92 340/917 |
| 2005/0168331 A1 | 8/2005 | Gunderson |
| 2005/0231384 A1 | 10/2005 | Shimotani |
| 2005/0242306 A1 | 11/2005 | Sirota |
| 2006/0082472 A1 | 4/2006 | Adachi |
| 2006/0152405 A1 | 7/2006 | Egri |
| 2006/0155427 A1 | 7/2006 | Yang |
| 2006/0287807 A1 | 12/2006 | Teffer |
| 2007/0016359 A1 | 1/2007 | Manor |
| 2007/0096943 A1 | 5/2007 | Arnold |
| 2007/0152869 A1 * | 7/2007 | Woodington ........... G01S 13/48 342/70 |
| 2007/0208495 A1 * | 9/2007 | Chapman ............. G08G 1/0104 701/117 |
| 2008/0012726 A1 | 1/2008 | Publicover |
| 2008/0263080 A1 | 10/2008 | Fukuma et al. |
| 2010/0069093 A1 | 3/2010 | Morrison |
| 2010/0214126 A1 | 8/2010 | Publicover |
| 2011/0068950 A1 | 3/2011 | Flaherty |
| 2013/0013179 A1 | 1/2013 | Lection et al. |
| 2013/0286198 A1 | 10/2013 | Fan et al. |
| 2014/0104310 A1 | 4/2014 | Kandogan |
| 2016/0300487 A1 | 10/2016 | Arnold |
| 2017/0069203 A1 | 3/2017 | Sharma |

FOREIGN PATENT DOCUMENTS

| | | |
|---|---|---|
| DE | 4223119 | 6/1993 |
| DE | 19530065 | 1/1997 |
| DE | 19820704 | 11/1999 |
| EP | 129251 | 12/1984 |
| EP | 0642190 | 3/1995 |
| EP | 0716949 | 6/1996 |
| EP | 0940690 | 3/1998 |
| EP | 0945715 | 3/1998 |
| EP | 0954049 | 4/1998 |
| EP | 0978729 | 8/1998 |
| EP | 1180758 | 2/2002 |
| EP | 1435036 | 7/2004 |
| FR | 2812402 | 2/2002 |
| GB | 1443701 | 7/1975 |
| GB | 1586305 | 3/1981 |
| JP | 4084300 | 3/1992 |
| JP | 6263487 | 6/1994 |
| JP | 6162387 | 6/2004 |
| WO | WO8001782 | 9/1980 |
| WO | WO1989006808 | 7/1989 |
| WO | WO1999008128 | 2/1999 |
| WO | WO2000045462 | 3/2000 |
| WO | WO200113141 | 2/2001 |
| WO | WO200113142 | 2/2001 |
| WO | WO2003027985 | 4/2003 |
| WO | WO2003027986 | 4/2003 |
| WO | WO2004063682 | 7/2004 |
| WO | WO2007053350 | 5/2007 |
| WO | WO2007112284 | 10/2007 |
| WO | WO2007115218 | 10/2007 |
| WO | WO2010103504 | 9/2010 |
| WO | WO2010144349 | 12/2010 |
| WO | WO2010144353 | 12/2010 |

OTHER PUBLICATIONS

*Applied Concepts, Inc.*, "Stalker Lidar Operator Manual," Copyright 2000.
"A Technical Tutorial on Digital Signal Synthesis" Analog Devices, Inc., Copyright 1999.
Atlantic Scientific Corporation: corporate overview, 6 pages.
Baker, "Grounding and Bonding—Part 3: Introduction and Resources," *IMSA Journal*, 2 pages.
Beard, Jeffrey C., Arnold, David V., "6GHz Range Finder Using Pulse Compression," *IGARSS* 2000 (Hawaii).
Berka, S. et al., "New Perspectives for ATMS: Advanced Technologies in Traffic Detection," *Journal of Transportation Engineering*, Jan./Feb. 1998, 7 pages.
Brennan, Thomas M., et al, "Visual Education Tools to Illustrate Coordination System Operation" *TRB 2011 Annual Meeting*, Nov. 15, 2010, 29 pages.
Buczkowski, "Automatic Lane Detection" 4 pages.
*Canadian Driver*, "Automatic Collision Avoidance System Unveiled," Jun. 12, 2002, http://www.canadiandriver.com/news/020612.htm, 3 pages.
Carlson, Brian, "Autoscope Clearing the Congestion: Vision Makes Traffic Control Intelligent" *Advanced Imaging*, Feb. 1997 5 pgs.
Chang, "RF and Microwave Wireless Systems" 2000 John Wiley & Sons, Inc. ISBNs: 0-471-35199-7.
Dailey, "A Statistical Algorithm for Estimating Speed from Single Loop Volume and Occupancy Measurements," Transporation Research Part B 33 (1999) p. 313-322.
Day, Christopher M., et al., "Computational Efficiency of Alternative Arterial Offset Optimization Algorithms" *TRB 2011 Annual Meeting*, Nov. 15, 2010, 31 pages.
Day, Christopher M., et al., "Reliability, Flexibility, and Environmental Impact Alternataive Arterial Offset Optimization Objective Functions" *TRB 2011 Annual Meeting*, Nov. 15, 2010, 32 pages.
Day et al., "Visualization and Assessment of Arterial Progression Quality Using High Resolution Signal Event Data and Measured Travel Time," Mar. 5, 2010, Purdue University, 31 pages.
Derneryd, Anders G., "Linearly Polarized Microstrip Antennas," *IEEE Transactions of Antennas and Propagation*, Nov. 1976, pp. 846-851.
*Detection Technology: For IVHS*—vol. 1: "Final Report Addendum," Publication No. FHWA-RD-96-100, Jul. 1995, 8 pages.

(56) References Cited

OTHER PUBLICATIONS

Detection Technology for IVHS: vol. 2. Synopsis of Final Report (1996) https://www.fhwa.dot.gov/publications/research/operations/ivhs/chapter2.cfm.
Detector User Needs from the traffic Signals Workshop Held in Seattle, WA. circa Jul. 2003, 42 pages.
Diker, Ahmet Can, et al. "Estimation of Traffic Congestion Level via FN-DBSCAN Algorithm by Using GPS Data," IV International Conference, PCI'2012, 2012, retrieved on [Jun. 5, 2014] Retrieved from internet: <URL:http://www.pci2012:science.az/1/19.pdf> entire document.
"Duraline Introduces Roadway Lighting Break-Away Systems," *Industry News*, Aug. 9, 2002, available at http://news.thomasnet.com/fullstory/roadway-lighting-disconnects-if-knocked-over-13184.
*Econolite Control Products, Inc.*"Autoscope Automates 100% of Video Detection Set-up: Introducing the Autoscope Wizard" Nov. 1, 2003, 2 pages.
*Econolite Control Products, Inc.* "Autoscope Solo Pro II Machine Vision Processor" 2003, 2 pgs.
*EIS Electronic Integrated Systems, Inc*, "RTMS Radar Traffic Detection—General Information," pp. 1-6, Available at least as early as Jul. 21, 2001.
*EIS Electronic Integrated Systems, Inc*, "RTMS Radar Traffic Detection—Traffic Detector Primer," pp. 1-4, Available at least as early as Jul. 21, 2001.
*EIS Electronic Integrated Systems, Inc.*, "RTMS User Manual," Issue 3, Sep. 2000.
*Electronique Controle Mesure*, "LOREN Multi-Lane Microwave Detector," Available at least as early as Mar. 1, 2002, 2 pages.
European Search Report for EP02775735 dated Mar. 9, 2006.
European Search Report for EP02770445 dated Mar. 15, 2005.
European Search Report for EP04701207 dated Oct. 23, 2006.
European Search Report for EP1435036 dated Mar. 9, 2006.
Examination Report dated Mar. 29, 2007 from European Patent Application No. 04 701 207.5, 3 pages.
Examination Report for Canadian Paten Application No. 2434756 dated Dec. 19, 2006.
Examination Report for EPO Patent Application No. 02770445, dated May 30, 2005.
Examination Report for EPO Patent Application No. 02775735.0-2215 dated Jun. 12, 2006.
Examination Report from Canadian Patent Application No. 2461411 dated Oct. 10, 2006.
Examination Report from Canadian Patent Application No. 2512689 dated Sep. 30, 2010.
Executive Summary: Scope of the Study http://www.tfhrc.gov/advanc/ivhs/chapter1.htm.
*FCC Federal Communications Commission, Consumer & Government Affairs Bureau*, "Digital Radio—The Sound of the Future," http://www.fcc.gov/cgb/consumerfacts/digitalradio.html, Reviewed/Updated on Sep. 24, 2003, 3 pages.
Federal Register, Jun. 1, 2001, vol. 66, No. 106, Participation in the Intelligent Transportation Infrastructure Program, 2 pages.
Final Decision for U.S. Appl. No. 09/964,688 entered on Jul. 17, 2017.
Forman, Michael, and Popovic, Zoya, "A K-Brand Ground-Backed CPW Balanced Coupler and Integrated Antenna Feed," *European Microwave Conference*, Oct. 2000, 4 pages.
Frederick, J.D., et al., "A Novel Single Card FMCW Radar Transceiver with on Board Monopulse Processing," Available at least as early as Mar. 1, 2002, 4 pgs.
Galani "An Overview of Frequency Synthesizers for Radars" IEEE Transactions on Microwave Theory and Techniques, vol. 39, No. 5, May 1991.
Gern, Axel, et al., "Advanced Lane Recognition—Fusing Vision and Radar," *Proceedings of the IEEE Intelligent Vehicles Symposium 2000*, Dearborn (MI) USA, Oct. 3-5, 2000, 7 pages.
Giles, Bradley C. and Jarrett, Bryan R., "Benefits of Auto-Configuring Traffic Sensing Equipment," Aug. 2004, 17 pages.

Gille, Sarah T. and Llewellyn Smith, Stefan G. "Velocity Probability Density Functions for Altimetry," *Journal of Physical Oceanography*, vol. 30, Jan. 2000, 12 pages.
Gonzalez, Juan Pablo, et al., "Lane Detection Using Histogram-Based Segmentation and Decision Trees," *2000 IEEE Intelligent Transportation Systems Conference Proceedings*, Dearborn (MI) USA, Oct. 10, 2000, 6 pages.
Gresham, Ian, et al., "Ultra Wide Band 24 GHz Automotive Radar Front-end," 2003 *IEEE MTT-S Digest*, 4 pages.
Howard, Julie, "Venture Capitalists Break Cover; Stellar Tech Ends 4 Years of Keeping a Low Profile," *The Idaho Statesman*, Sep. 9, 2003; http://www.idahostatesman.com/Business/story.asp?ID=48714, 2 pages.
*Idaho Business IQ*, "Stellar Opportunities: How One Idaho Investment Firm Views the State's Business Future," Idaho Business IQ, Nov./Dec. 2003, 5 pages.
*ISMA Journal*, "News Around the Industry, Spruce Meadows Partners," Nov./Dec. 2004, 4 pages.
Institution of Inter Partes Review 37 C.F.R. 42.108 for case IPR2016-00488 entered on Jul. 18, 2016.
International Preliminary Examination Report for PCT/US02/27682 dated Sep. 2, 2004.
International Preliminary Search Report for PCT/US02/27630 dated Aug. 16, 2004.
International Search Report and Written Opinion for PCT/US2010/037602 dated Aug. 6, 2010.
International Search Report and Written Opinion from PCT/US2007/064711 dated Sep. 4, 2008.
International Search Report and Written Opinion from PCT/US2010/037596 dated Aug. 19, 2010.
International Search Report for and Written Opinion PCT/US2014/013412 dated May 22, 2014.
International Search Report for PCT/US2002/27630 dated Dec. 3, 2002.
International Search Report for PCT/US2002/27682 dated Jun. 20, 2003.
International Search Report for PCT/US2004/00471 dated Aug. 31, 2005.
International Search Report for PCT/US2006/41324 dated May 1, 2007.
*ISS & Econolite at Wavetronix*, "Dilemma Zone Detector (DZD): Summary Requirements" dated Jul. 18, 2003, 2 pages.
ITS Decision, Other Roadside Detectors, Intelligent Transporation Systems—Traffic Surveillance.
Jansson, Jonas, et al., "Decision Making for Collision Avoidance Systems," Copyright 2002, *Society of Automotive Engineers* Publication No. 2002-01-0403, 8 pages.
Kim, Ihn S., et al., "Two Novel Vehicle Detectors for the Replacement of a Conventional Detector," *Microwave Journal (International ed.)*. Dedham: Jul. 2001 vol. 44, Iss. 7; http://proquest.umi.com/proxygw.wric.org/pqdlink?Ver. 7 pages.
Klein, Lawrence A., "Sensor Technologies and Data Requirements for ITS", Artech House, Norwood, MA, Jun. 2001, 739 pages.
Klotz, Michael, et al., "An Automotive Short Range High Resolution Pulse Radar Network," Jan. 2002.
Kolton, Greg, "Mobility Technologies Offers Exclusive Data and Technology with New Traffic Pulse Partner Program," Mobility Technologies, The Traffic.com People, Press Release, May 31, 2001, 6 pages.
Kotzenmacher, Jerry, et al., "Evaluation of Non-Intrusive Traffic Detection System," *2004 North American Travel Monitoring Exhibition & Conference (NATMEC)*, Jun. 27, 2004, 13 pages.
Kramer, Gerd, "Envisioning a Radar-Based Automatic Road Transporation System," *Intelligent Transportation Systems*, May/Jun. 2001, 3 pages.
Lawson, "Case Histories Keeping That Cargo Dry and Viable".
Liu, Henry X., et al., "Development of Real-Time Arterial Performance Monitoring System Using Traffic Data Available for Existing Signal Systems" *Minnesota Department of Transportation Report*, Dec. 2008, 117 pages.
Liu, Huan-Chang, et al., "Radiation of Printed Antennas with a Coplanar Waveguide Feed," *IEEE Transactions on Antennas and Propagation*, vol. 43, No. 10, Oct. 1995, pp. 1143-1148.

(56) References Cited

OTHER PUBLICATIONS

Ma, Bing, et al., "Road and Lane Edge Detection with Multisensor Fusion Methods," *IEEE Publication* No. 0-7803-5467-2/99 Copyright 1999.
Madjar et al. "A novel DDS based 94 GHz high linearity FMCW RF front end, 26th EuMC" Sep. 9-12, 1996.
Manor, Daniel, "SPIDER: A Wireless Solution for Mid-block Detection," *IMSA Journal*, Mar./Apr. 2003, 6 pages.
McKeon, "John Foster: Stellar Technologies".
Mende, Ralph Dr., et al., "A 24 GHz ACC Radar Sensor," *Smart Microwave Sensors GmbH*, Feb. 28, 2005.
Mende, Ralph, "The UMRR 24GHz Radar Sensor Family for Short and Medium Range Applications" *Smart Microwave Sensors GmbH*, Apr. 8, 2004.
Mende, Ralph, "UMRR: A 24GHz Medium Range Radar Platform," *Smart Microwave Sensors GmbH*, Jul. 25, 2003.
Merlo, "Automotive Radar for the Prevention of Collisions," IEEE, Feb. 1964.
Metzler, T., "Microstrip Series Arrays," *IEEE Transactions on Antennas and Propagation*, vol. AP-29, No. 1, Jan. 1981, pp. 174-178.
Middleton, Dan and Parker, Rick, "Initial Evaluation of Selected Detectors to Replace Inductive Loops on Freeways, Report No. FHWA/TX-00/1439-7," *Texas Transportation Institute*, on behalf of the Texas Department of Transporation; Construction Division, Apr. 2000, 90 pages.
*Millimeter Wave Radar Traffic Sensor AutoTrak*, Transportation Systems, Aug. 17, 2004 2 pages.
MS Sedco, Motion Sensors, "TC26-B Microprocessor-Controlled Vehicle Detector," Available at least as early as Mar. 1, 2002, at www.microwavesensors.com/motionsensors.html 6 pages.
NASA Jet Propulsion Laboratory: California Institute of Technology, "Ocean Surface Topography from Space-Technology", available at https://sealevel.jpl.nasa.gov/technology/.
*Naztec ATMS Solutions*, "Accuwave LX-150 Microwave Detector," Sugar Land, Texas; Available at least as early as Mar. 1, 2002, 3 pages.
Nunez-Garcia, Javier, et al., "Random Sets and Histograms," *Control Systems Center, UMIST, Fuzz-IEEE* 2001: 1183-1186, http://www.umist/ac.uk/csc 2001, 6 pages.
On-Bench Photographs of Detectors, pp. 1-9, Available at least as early as Jan. 16, 2002 at http://ntl.bts.gov/DOCS/96100/ch04/body_ch04_04.html.
*Optisoft the Intelligent Traffic Signal Platform*, "Red Light Hold Radar-based System Prevents Collisions from Red Light Runners" Available at least as early as Aug. 30, 2010, 2 pages.
*Optisoft the Intelligent Traffic Signal Platform*, "Transportation Sensors Optional Features for the OptiSoft ITS Platform" Available at Least as Early as Aug. 30, 2010 1 pages.
Palen, J. "A Watching Brief," *Traffic Technology International* Oct./Nov. 2001 p. 43-46.
Pilutti, Tom, et al., "Identification of Driver State for Lane-Keeping Tasks" *IEEE Transaction on Systems, Man, and Cybernetics—Part A Systems and Humans*, vol. 29, No. 5, Sep. 1999, 17 pages.
Pordage, P. et al., "Technology at the Crossroads: New Radar Sensor Allows Pedestrians and Traffic to Coexist," *Cambridge Consultants* Feb. 24, 2004.
Protest Under 37 C.F.R. 1.291 filed in U.S. Appl. No. 15/487,228 entered on Aug. 29, 2017.
Pumrin, S., et al., "Roadside Camera Motion Detection for Automated Speed Measurement," *The IEEE 5th International Conference on Intelligent Transportation Systems*, Sep. 30, 2002, Singapore, 5 pages.
*Railway Grade Crossing Sensor*, Transportation Systems, Aug. 17, 2004 1 page.
Reijmers, Han, et al., "Performance Analysis of Slotted Aloha on a Three Lane Motorway Using Measured Vehicle Positions," *IEEE Publication* No. 0-7803-3659-3/97, Copyright 1997 IEEE, 5 pages.
Reijmers, Han, et al., "The Influence of Vehicle Distribution Models on Packet Success Probability on a Three Lane Motorway," *IEEE Publication* No. 0-7803-4320-4/98, Copyright 1998 IEEE, 5 pages.
Reynolds, Desiccant City: Case Histories: Award Winners, "Technical Achievements Shine Among FPA Winners".
Rivenq-Menhaj, et al., "Combining Two Radar Techniques to Implement a Collision Avoidance System," *IOP Electronic Journals, Measurement Science and Technology*, www.iop.org/EJ/abstract/09570233/9/8/030, from Meas. Sci Technol. 9 1343-1346, Aug. 1998, 2 pages.
Saito, Atsuchi, "Image Sensor for Measuring Volumes by Direction" *International Sales & Marketing Department Social Systems Solution & Service Business Company OMRON Corporation*, Tokyo Japan ITS World Congress Oct. 2014 1 page.
Sakai, Yasunobu, et al., "Optical Spatial filter Sensor for Ground Speed," Presented at the *International Commission of Optics Topical Meeting*, Kyoto, 1994, Optical Review, vol. 2, No. 1 (1995), 3 pages.
Schoepflin, Todd N., et al., "Dynamic Camera Calibration of Roadside Traffic Management Cameras," *The IEEE 5th International Conference on Intelligent Transportation Systems*, Sep. 3-6, 2002, Singapore, 6 pages.
SCOOT Advice Leaflet 1: The "SCOOT" Urban Traffic Control System; http://www.scoot-utc.com/documents/1_SCOOT-UTC; Nov. 14, 2012.
Sensor Technologies & Systems, Inc. AutoTrak Intelligent Transportation Systems/Advanced Traffic Management Systems Aug. 17, 2004 2 pgs.
Sensys RS240 Radar Sensor, circa Oct. 2002.
Smarglik, Edward J., et al., "Event-Based Data Collection for Generating Actuated Controller Performance Measures" *Journal of the Transportation Research Board*, No. 2035, 2007, pp. 97-106.
SmartSensor Installation Guide WaveTronix Copyright 2004 pp. 1-26.
*SmarTek Systems, Inc.* "SmarTek Acoustic Sensor—Version 1 (SAS-1) Installation and Setup Guide;" Apr. 3, 2003.
*SmarTek Systems, Sensing and System Integration Solutions*, "The SAS 1 Passive Acoustic Vehicle Detector" Jan. 14, 2002, 2 pages.
Smith, Ryan L., et al., "Development of a Low Cost, FM/CW Transmitter for Remote Sensing," IGARSS 2000 (Hawaii).
*SpeedInfo less traffic, more time*, "DVSS-1000 Installation Manual and Users Guide," Rev. 2.0, Feb. 18, 2004, 10 pages.
Stevenage, Herts, "IF Digital Generation of FMCW Waveforms for Wideband Channel Characterization," *IEEE Proceedings-I*, vol. 139, Jun. 1992 pp. 281-288.
Stewart, B.D., etal "Adaptive Lane Finding in Road Traffic Image Analysis" University, Edinburgh, Uk Road, Traffic Monitoring and Control, Apr. 26-28, 1994 Conference Publication No. 391, IEEE, 1994 pp. 133-136.
Swangnate et al., A Conductor-Backed Coplanar Waveguide Direction Coupler for Varactor-Tuned Phase Shifting, Journal of KMITNB, vol. 12, No. 2, Apr.-Jun. 2002, 5 pages.
Task Force L Final Report, Executive Summary, pp. 1-40, Available at least as early as Jan. 16, 2002.
Transportation Operations Group—Sensors, pp. 1-13, Available at least as early as Jul. 21, 2001.
Transportation Operations Group—Sensors, TTI Workshop on Vehicle Detection, TexITE Meeting, College Station, Texas, Jun. 22, 2000, 37pages, Available at: http://trasops.tamu.edu/content/sensors.cfm.
University Research in Support of the Department of Transportation Program on Remote Sensing Applications in Transportation (DTRS56-00-BAA-0004) Nov. 1999.
U.S. Department of Transportation, Federal Highway Administration, "Detection Technology for IVHS," vol. I: Final Report, December 1996, 182 pages.
*U.S. Department of Transportation Federal Highway Administration*, "Field Test of Monitoring of Urban Vehicle Operations Using Non-Intrusive Technologies, Final Report," May 1997, 123 pages.
Veeraraghavan, Harini, et al., "Computer Vision Algorithms for Intersection Monitoring" *IEEE Transactions on Intelligent Transportation Systems*, vol. 4, No. 2, Jun. 2003.

(56) References Cited

OTHER PUBLICATIONS

Waite, Jonathan L., and Arnold, David W. "Interferometric Radar Principles in Track Hazard Detection to Improve Safety," *IGASRSS* 2000 (Hawaii).
Walkenhorst, Brett T., et al., "A Low cost, Radio Controlled Blimp as a Platform for Remote Sensing," 2000 (Hawaii).
Waner, Stefan and Costenoble, Steven R., "Calculus Applied to Probability and Statistics," *Calculus and Probability*, Sep. 2, 1996, http://people/hofstra.edu/faculty/Stefan_Waner/cprob/cprob2.html, 13 pages.
Wang, et al. "Coordinated Vehicle Platoon Control: Weighted and Constrained Consensus and Communication Network Topologies," 51st IEEE Conference on Decision and Control, 2012, retrieved on [Jun. 5, 2014] Retrieved from the internet: <URL: http://www.cs.wayne.edu/-hzhang/group/publications/pitCDC.pdf> entire document.
Weil, et al., "Across-the-Road Photo Traffic Radar: New Calibration Techniques," Electromagnetics Division (818.02), National Institute of Standards and Technology, 4 pages.
Wilson, Christopher K.H., et al., "The Potential of Precision Maps in Intelligent Vehicles," *Proceeding of IEEE Internaltion Conference on Intelligent Vehicles*, IEEE Oct. 1998, 4 pages.
Written Opinion for PCT/US02/27630 dated Jun. 11, 2003.
Yang, Li, et al., "Bi-Mode Time-Space Multiplexing Antenna Array for Multi-Targets Detection in Automotive Application," *IEEE Publication* No. 0-7803-7070-8/01, Copyright 2001 IEEE, 4 pages.
Yellin, Daniel, et al., "An Algorithm for Dual-Chanel Noiseless Signal Reconstruction and its Performance Analysis," *IEEE Transactions on Signal Processing*, vol. 47, No. 6, Jun. 1999, 17 pages.
Yung, N.H.C., et al., "Vehicle-Type Identification through Automated Virtual Loop Assignment and Block-Based Direction biased Motion Estimation," *IEEE Publication* No. 0-7893-4975-X/98, Copyright 1999 IEEE, 5 pages.
Zaugg, David A., et al., "Ocean Surface and Landslide Probing with a Scanning Radar Altimeter," *IGARSS* 2000 (Hawaii).
U.S. Appl. No. 09/966,146, Sep. 10, 2002, Office Action.
U.S. Appl. No. 09/966,146, Dec. 31, 2002, Notice of Allowance.
U.S. Appl. No. 09/964,668, Nov. 6, 2002, Office Action.
U.S. Appl. No. 09/964,668, Oct. 1, 2003, Notice of Allowance.
U.S. Appl. No. 10/744,686, Mar. 9, 2005, Office Action.
U.S. Appl. No. 10/744,686, Jun. 24, 2005, Office Action.
U.S. Appl. No. 10/744,686, Dec. 2, 2005, Notice of Allowance.
U.S. Appl. No. 10/744,686, Jan. 29, 2007, Office Action.
U.S. Appl. No. 10/744,686, Aug. 9, 2007, Notice of Allowance.
U.S. Appl. No. 10/744,686, Nov. 21, 2007, Notice of Allowance.
U.S. Appl. No. 10/744,686, Mar. 7, 2008, Notice of Allowance.
U.S. Appl. No. 10/754,217, Apr. 22, 2005, Office Action.
U.S. Appl. No. 10/754,217, Nov. 17, 2005, Office Action.
U.S. Appl. No. 10/754,217, Feb. 28, 2006, Notice of Allowance.
U.S. Appl. No. 10/754,217, Jun. 20, 2006, Office Action.
U.S. Appl. No. 10/754,217, Jan. 11, 2007, Office Action.
U.S. Appl. No. 10/754,217, Aug. 17, 2007, Notice of Allowance.
U.S. Appl. No. 10/754,217, Oct. 11, 2007, Office Action.
U.S. Appl. No. 10/754,217, Apr. 8, 2008, Notice of Allowance.
U.S. Appl. No. 11/264,339, Apr. 6, 2009, Notice of Allowance.
U.S. Appl. No. 11/614,250, Nov. 4, 2009, Office Action.
U.S. Appl. No. 11/614,250, Mar. 11, 2010, Notice of Allowance.
U.S. Appl. No. 11/614,250, Jun. 10, 2010, Notice of Allowance.
U.S. Appl. No. 11/614,250, Oct. 20, 2010, Notice of Allowance.
U.S. Appl. No. 11/614,250, Dec. 6, 2010, Notice of Allowance.
U.S. Appl. No. 11/689,441, Jan. 8, 2010, Office Action.
U.S. Appl. No. 11/689,441, Jun. 16, 2010, Notice of Allowance.
U.S. Appl. No. 11/689,441, Sep. 9, 2010, Notice of Allowance.
U.S. Appl. No. 11/689,441, Dec. 10, 2010, Notice of Allowance.
U.S. Appl. No. 11/689,441, Mar. 29, 2011, Notice of Allowance.
U.S. Appl. No. 12/502,965, Nov. 15, 2011, Notice of Allowance.
U.S. Appl. No. 12/502,965, Feb. 27, 2012, Notice of Allowance.
U.S. Appl. No. 12/546,219, Mar. 11, 2010, Notice of Allowance.
U.S. Appl. No. 12/546,219, Jun. 10, 2010, Notice of Allowance.
U.S. Appl. No. 12/546,219, Oct. 22, 2010, Notice of Allowance.
U.S. Appl. No. 12/546,219, Dec. 6, 2010, Notice of Allowance.
U.S. Appl. No. 12/546,196, Nov. 5, 2009, Notice of Allowance.
U.S. Appl. No. 12/546,196, Jan. 27, 2010, Notice of Allowance.
U.S. Appl. No. 12/546,196, Feb. 26, 2010, Notice of Allowance.
U.S. Appl. No. 12/546,196, Jun. 24, 2010, Notice of Allowance.
U.S. Appl. No. 12/546,196, Sep. 27, 2010, Notice of Allowance.
U.S. Appl. No. 12/546,196, Dec. 6, 2010, Notice of Allowance.
U.S. Appl. No. 12/710,736, Mar. 26, 2013, Office Action.
U.S. Appl. No. 12/710,736, Oct. 15, 2013, Notice of Allowance.
U.S. Appl. No. 13/753,869, Nov. 6, 2014, Office Action.
U.S. Appl. No. 13/753,869, Aug. 25, 2015, Final Office Action.
U.S. Appl. No. 13/753,869, Mar. 30, 2016, Notice of Allowance.
U.S. Appl. No. 14/164,102, Sep. 25, 2015, Notice of Allowance.
U.S. Appl. No. 14/962,377, Nov. 9, 2016, Notice of Allowance.
U.S. Appl. No. 15/198,512, Jun. 1, 2017, Office Action.
U.S. Appl. No. 15/198,512, Feb. 15, 2018, Final Office Action.
U.S. Appl. No. 15/187,508, Jun. 2, 2017, Ex Parte Quayle.
U.S. Appl. No. 15/187,508, Aug. 10, 2017, Notice of Allowance.
U.S. Appl. No. 15/187,508, Dec. 26, 2017, Notice of Allowance.
U.S. Appl. No. 15/487,228, Apr. 10, 2018, Office Action.
U.S. Appl. No. 15/487,228, Dec. 10, 2018, Final Office Action.

\* cited by examiner

DETECTING ROADWAY TARGETS ACROSS BEAMS

CROSS-REFERENCE TO RELATED APPLICATIONS

This application is a continuation of U.S. patent application Ser. No. 15/187,508, entitled "Detecting Roadway Targets within a Multiple Beam Radar System," filed on Jun. 20, 2016, which is a divisional application of U.S. patent application Ser. No. 14/164,102, entitled "Detecting Roadway Targets Across Beams", filed Jan. 24, 2014, which is now U.S. Pat. No. 9,240,125 issued Jan. 19, 2016, which is a continuation of U.S. patent application Ser. No. 12/710,736, entitled "Detecting Roadway Targets Across Beams Including Filtering Computed Positions", filed Feb. 23, 2010, which is now U.S. Pat. No. 8,665,113 issued Mar. 4, 2014, which is incorporated by reference herein in its entirety, which claims the benefit of and priority to U.S. Provisional Application No. 61/185,005, entitled "Detecting Targets in Roadway Intersections and Tracking Targets Across Beams", filed on Jun. 8, 2009, which is incorporated by reference herein in its entirety. U.S. patent application Ser. No. 12/710,736, entitled "Detecting Roadway Targets Across Beams Including Filtering Computed Positions", filed Feb. 23, 2010, which is now U.S. Pat. No. 8,665,113 issued Mar. 4, 2014, is also a continuation-in-part of U.S. patent application Ser. No. 11/614,250, entitled "Detecting Targets in Roadway Intersections", filed Dec. 21, 2006, which is now U.S. Pat. No. 7,889,097 issued Feb. 15, 2011, which is incorporated by reference herein in its entirety, and also is a continuation-in-part of U.S. patent application Ser. No. 12/502,965, entitled "Detecting Targets In Roadway Intersections", filed Jul. 14, 2009, which is now U.S. Pat. No. 8,248,272, issued Aug. 21, 2012, which is a continuation-in-part of U.S. patent application Ser. No. 11/264,339, entitled "Systems and Methods for Configuring Intersection Detection Zones", filed Oct. 31, 2005, which is now U.S. Pat. No. 7,573,400, issued Aug. 11, 2009, both of which are incorporated by reference herein in their entirety.

BACKGROUND

1. Background and Relevant Art

The use of traffic sensors for the actuation of traffic signal lights located at roadway intersections is quite common. Generally, such traffic sensors can provide input used to properly actuate traffic control devices in response to the detection or lack of detection of vehicles. For example, traffic sensors can enable a traffic control device to skip unnecessary signal phases, such as, for example, skipping a left hand turn phase when no vehicles are detected in a corresponding left hand turn lane.

Traffic sensors can also enable a traffic signal to increase green light duration for major arterials by only signaling the green light in the minor cross streets when vehicles are detected on the minor cross streets and thus minimizing the red light for a major arterial. Thus, traffic sensors assist in properly actuating a signalized intersection to improve traffic flow. In addition to the actuation of signalized intersections of roadways for automobile traffic, traffic sensors are also used for the actuation of intersections of a roadway for automobile traffic with a railway.

Unfortunately, the cost of traffic sensors, the cost of corresponding installation, and the subsequent maintenances costs can be relatively high. Thus, traffic sensors and related costs can become a significant expenditure for municipalities. The high installation costs arise at least in part from the need to shut down lanes of traffic and cut into the roadway surface. High maintenance costs arise from the need to repair and reconfigure sensors that do not consistently perform well.

Typically, traffic signal lights have been actuated using inductive loop detectors embedded in the roadway. Inductive loop detectors are very expensive to install since lane closures are necessary. The high cost is compounded, especially for multi-lane roadways, since at least one inductive loop detector is required for each detection zone (e.g., left hand turn lane detection zones, through lane detection zones, and right hand turn lane detection zones). Furthermore, inductive loop detector technology is often unreliable and inductive loop detectors require a great deal of calibration.

Similar to inductive loop detectors, magnetometer detectors are embedded in the roadway surface and require lane closures to install. Furthermore, some of these detectors are dependent on batteries for operation, bringing into question the usable life of the sensor. Additionally, the sensors must be replaced or reinstalled when the roadway is resurfaced.

Video detectors are also used in some traffic signal actuation systems. To facilitate traffic signal light actuation, a video camera is placed high above a signal arm such that the video camera's view covers one approach to the intersection. The video signal from the camera is digitally processed to create detections in the defined zones. Using video detectors an intersection can be monitored on a per approach basis (that is all the lanes of an approach), as opposed to the per detection zone basis used with inductive loops. Since a dedicated mounting arm is often necessary the installation of a video detector system can also be expensive and time consuming. Furthermore, video detectors require a great deal of maintenance since the video cameras often fail and they require cleaning. The performance of video detection is affected by visibility conditions such as snow, rain, fog, direct light on the camera at dusk and dawn, and the lighting of the roadway at night.

Microwave detectors have also been used in intersections to provide detection coverage over limited areas. At least one microwave detector has a limited degree of mechanical and electrical steering. Further, the coverage is typically over a small portion of the intersection.

Other microwave sensors have included multiple receive antennas but have included only a single transmit antenna that has a very broad main beam or even may be an omni-directional antenna. Systems that employ only one broad beam or omni-directional transmit antenna typically cannot achieve an appropriately reduced side lobe power level. Furthermore, these single transmit antenna systems typically suffer from widening of the main lobe.

At least one microwave detector, which has been used for mid-block traffic detection applications near intersections, has two directional receive antennas and one directional transmit antenna. The multiple antennas create parallel radar beams that can be used to make velocity measurements as vehicles pass through the beams. However, the antennas of this device cannot cover enough of the intersection to provide coverage over a large area.

Acoustic sensors have also been used in intersections to cover limited detection zones. However, these sensors only monitor a limited area on an intersection approach and are subject to detection errors arising from ambient noise.

BRIEF SUMMARY

The present invention extends to methods, systems, and computer program products for detecting roadway targets across beams. In some embodiments, computed target positions of targets detected using a multiple radar system are filtered. One or more targets are detected in a plurality of beams of the multiple beam radar system. Positions are computed for the one or more targets for a first detection period. Positions are computed for the one or more targets for a second detection period. The computed positions for the one or more targets are filtered using a subset of computed positions from the first detection period and using a subset of computed positions from the second detection period.

Targets can be detected in a plurality of beams of the multiple beam radar system using a variety of different mechanisms. For example, returns from the multiple beam radar system can be divided into a grid of range bins. Dividing returns into a grid of range bins includes dividing each beam in the plurality of beams into a plurality of range bins of uniform varied distances from the multiple beam radar system. Each beam is divided into a plurality of range bins in accordance with the uniform varied distances In some embodiments, an energy peak is identified within a single beam of the multiple beam radar system. The identified energy peak can indicate a detected target.

In other embodiments, a multi-beam image is identified from within the returns from the multiple beam radar system. The multi-beam image can span a sub-plurality of the plurality of beams and span a plurality of range bins within the grid. An identified energy peak within the multi-beam image can indicate a detected target.

In further embodiments, a first comprehensive image is created from returns for each beam at a first detection period. A second comprehensive image is created from returns for each beam at a second subsequent detection period. The first comprehensive image is compared to the second comprehensive image. Differences between the first and second images are identified. The identified differences can indicate a detected target.

In some embodiments, the computed target positions are filtered to remove errors from the computed positions. As part of this filtering process, track files are created for targets within a roadway. A target list for the roadway is accessed. A track file for each target in the roadway is maintained. Each track file includes target data for a target that is within the roadway. The target data includes target position data for a target, the target position data including at least one of: a last known position for the target and a predicted position for the target.

Maintaining track files includes accessing a currently computed position from the target list and accessing a specified track file for an existing target. If the specified track file has target position data corresponding to the currently computed position, then it is determined that the currently computed position corresponds to a position of the existing target. The determination can be made by comparing the currently computed position to the target position data in the accessed track file. The specified track file for the existing target is updated when the currently computed position is determined to correspond to the position of the existing target. On the other hand, a new track file is created for a new target when the currently computed position is determined not to correspond to the position of the existing target.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
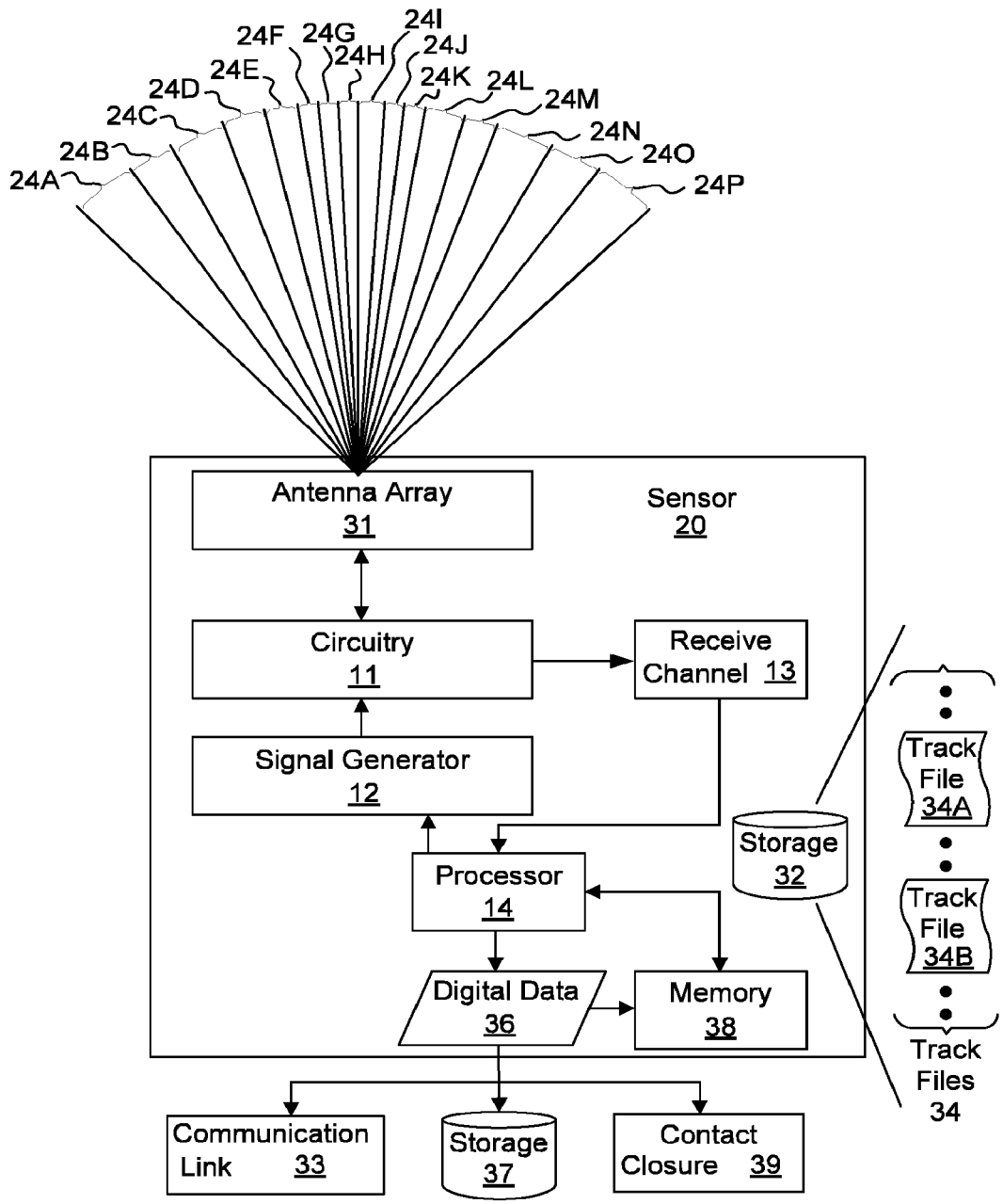
FIG. 1 illustrates an embodiment of a traffic sensor.

The present invention extends to methods, systems, and computer program products for detecting roadway targets across beams. In some embodiments, computed target positions of targets detected using a multiple radar system are filtered. One or more targets are detected in a plurality of beams of the multiple beam radar system. Positions are computed for the one or more targets for a first detection period. Positions are computed for the one or more targets for a second detection period. The computed positions for the one or more targets are filtered using a subset of computed positions from the first detection period and using a subset of computed positions from the second detection period.

Targets can be detected in a plurality of beams of the multiple beam radar system using a variety of different mechanisms. For example, returns from the multiple beam radar system can be divided into a grid of range bins. Dividing returns into a grid of range bins includes dividing each beam in the plurality of beams into a plurality of range bins of uniform varied distances from the multiple beam radar system. Each beam is divided into a plurality of range bins in accordance with the uniform varied distances In some embodiments, an energy peak is identified within a single beam of the multiple beam radar system. The identified energy peak can indicate a detected target.

In other embodiments, a multi-beam image is identified from within the returns from the multiple beam radar system. The multi-beam image can span a sub-plurality of the plurality of beams and span a plurality of range bins within the grid. An identified energy peak within the multi-beam image can indicate a detected target.

In further embodiments, a first comprehensive image is created from returns for each beam at a first detection period. A second comprehensive image is created from returns for each beam at a second subsequent detection period. The first comprehensive image is compared to the second comprehensive image. Differences between the first and second images are identified. The identified differences can indicate a detected target.

In some embodiments, the computed target positions are filtered to remove errors from the computed positions. As part of this filtering process, track files are created for targets within a roadway. A target list for the roadway is accessed. A track file for each target in the roadway is maintained. Each track file includes target data for a target that is within the roadway. The target data includes target position data for a target, the target position data including at least one of: a last known position for the target and a predicted position for the target.

Maintaining track files includes accessing a currently computed position from the target list and accessing a specified track file for an existing target. If the specified track file has target position data corresponding to the currently computed position, then it is determined that the currently computed position corresponds to a position of the existing target. The determination can be made by comparing the currently computed position to the target position data in the accessed track file. The specified track file for the existing target is updated when the currently computed position is determined to correspond to the position of the existing target. On the other hand, a new track file is created for a new target when the currently computed position is determined not to correspond to the position of the existing target.

Embodiments of the present invention may comprise or utilize a special purpose or general-purpose computer including computer hardware, such as, for example, a processor, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, traffic sensors, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Accordingly, in this specification and in the following claims, a computer system is also defined to include traffic sensors (e.g., sensor 20 in FIG. 1).

In this specification and in the following claims, the term "roadway intersection" is defined as the intersection of two or more roadways for automobile and/or truck traffic including the approaches to the intersection and also includes an intersection of roadways with one or more thoroughfares for other traffic, including the approaches to the intersection. Thoroughfares for other traffic may include pedestrian paths and railways.

Embodiments of the invention include intersection traffic detection products that: can be mounted above the roadway surface, monitor a wide portion of the roadway, and are robust to varying lighting and weather conditions.

FIG. 1 is an example traffic sensor 20. Generally, traffic sensor 20 can be used to detect objects (e.g., vehicles, pedestrians, etc.) at a roadway. As depicted, traffic sensor 20 includes antenna array 31, circuitry 11, signal generator 12, receive channel 13, processor 14, and memory 38.

Generally, antenna array 31 is configured to create antenna beams over which a transmit signal is propagated and/or from which received signals are received. In some embodiments, antenna array 31 creates multiple antenna beams that are steered so that the antennas overlap at their 3 dB points creating continuous coverage over a 90 degree area.

Antenna array 31 can include a plurality (and potentially a large number) of transmit antennas and can include a plurality (and potentially a large number) of receive antennas. Transmit antennas can be configured to transmit signals into a roadway. Transmit antennas can be directional antennas used to transmit a signal. Receive antennas can be configured to receive reflections of signals reflected off of objects in the roadway. The reflections can correspond to two dimensional image data for the roadway. Receive antennas can also be directional antennas used to receive (e.g., reflected) signals.

Using directional antennas (potentially for both transmit antennas and receive antennas) has at least two advantages over the use of other types of antennas, including broad beam antennas. One advantage is that the sidelobe level in the two way antenna pattern is reduced. Another advantage is that the width of the mainlobe in the two way antenna pattern is also reduced.

Generally, the number of transmit and receive antennas used in an antenna area can be matched to the size of the area that is to be covered. For larger areas the number of transmit and receive antennas can be increased. In some embodiments, the number of transmit and receive antennas is selected to provide sufficient angular resolution or sufficient coverage.

In some embodiments, instead of using a number of fixed beam antennas, an electronically steerable antenna is used to create beams that are steered to different angles. For example, the electronically steerable beam may be steered 10 degrees to the left for one detection period and it may be steered 20 degrees to the left in the next detection period and so on.

Still in other embodiments, beam forming is used to create the antenna beams that are steered to different angles. In a sensor in which beam forming is used, data is collected from a number of antenna elements and is then combined using digital signal processing to create a beam that is steered to the desired direction.

Signal generator 12 is configured to generate a radar signal. Generally, circuitry 11 is configured to provide a transmitting transmission path between signal generator 12 and antenna array 31. Signals generated at signal generator 12 can pass from signal generator 12, along the transmitting transmission path, to antenna array 31 for transmission. The transmitting transmission path can include appropriate switches that switch the transmission path to each (e.g., transmitting) antenna in the antenna array 31 in sequence.

Circuitry 11 is also configured to provide a receiving transmission path between antenna array 31 and receive channel 13. Reflected signals received at antenna array 31 can pass from antenna array 31, along the receive transmission path, to receive channel 13. The receive transmission path can include a mixer that mixes down received reflected signals to baseband.

Receive channel 13 is configured to condition received reflections for compatibility with processor 14. When appropriate, receive channel 13 provides one or more of: multiplexing, filtering, and amplification before providing received signals for analog to digital conversion. In some embodiments, baseband signal lines are multiplexed to a single signal line.

Processor 14 processes signals corresponding to received reflections to convert the signals into meaningful digital data (e.g., digital data 36). In some embodiments, the processing algorithms combine the data from the plurality of antennas into one complete (e.g., two dimensional) image before detecting vehicles. Processor 14 can be a digital signal processor configured to convert received signals into digital data and deliver digital data to external components, such as, for example, communication link 33 (e.g., to a display device or another computer system), storage 37, and contact closure 39. Storage 37 can be a computer-readable storage media, such as, for example, a magnetic disk, an optical disk, a flash drive, RAM, etc.)

Digital data 36 can include, for example, a sensor configuration, presence indications, vehicle detections, estimated vehicle speed, and traffic statistics. Traffic statistics can include: vehicle counts per lane; vehicle counts per direction; vehicle counts per approach; turning counts; average speeds per lane, direction, or approach; 85th percentile speeds per lane, direction, or approach; occupancy per lane, direction, or approach; etc.

Processor 14 can also be configured to control signal generator 12. For example, processor 14 can send a signal activation command to signal generator 12 when signal generator 12 is to generate a signal.

As depicted, sensor 20 includes system memory 38 (e.g., RAM and/or ROM). Processor 14 can utilize system memory 38 when processing digital data 36. For example, sensor 30 can execute computer-executable instructions stored in ROM to process digital data 36. During processing of digital data 36, processor 14 can store values in RAM and retrieve values from RAM.

Also as depicted, sensor 20 includes storage 32. Storage 32 can include more durable computer storage media, such as, for example, a flash drive or magnetic hard disk. Thus, sensor 20 can also execute computer-executable instructions stored storage 32 and use RAM to store and retrieve values during execution. In some embodiments, computer-executable instructions stored at sensor 20, when executed at processor 14, detect energy peaks in two dimensional image data for a roadway.

In this specification and in the following claims "track file" is defined as a collection of data associated with a target (e.g., vehicle), which is used to monitor the movements of that target, such as, for example, in a roadway. A track file can contain information for a target, such as, for example, current position data that consists of range and azimuth angle information, starting position, position history, current vector velocity, vector velocity history, predicated position, as well as radar return characteristics such as brightness, scintillation intensity, and signal spread in range. As such, based on sensor data, processor 14 can also create and store track files, such as, for example, track files 34A, 34B, etc., in memory 38 or storage 32. Stored track files can be subsequently accessed and updated (e.g., modified and deleted) as further information related to a target is sensed. Accordingly, in other embodiments, computer-executable instructions stored at sensor 20, when executed at processor 14, create and/or update track files for a roadway.

Signal generator 12 can be a radio frequency ("RF") generator that generates RF signals. For example, signal generator 12 can generate a frequency modulated continuous wave ("FMCW") RF signal. The FMCW RF signal can be generated via direct digital synthesis and frequency multiplication. In these embodiments, circuitry 11 includes RF circuitry having RF switches. The RF switches are used to switch the transmission path for an RF signal to each (e.g., transmitting) antenna in the antenna array 31 in sequence.

In these embodiments, the RF circuitry is also configured to provide a receiving transmission path for received reflected RF signals. Receive channel 13 can condition received reflected RF signals for compatibility with processor 14. When appropriate, receive channel 13 provides one or more of: multiplexing, filtering, and amplification before providing received reflected RF signals for analog to digital conversion.

Also in these embodiments, the same antenna can be used to both transmit an RF signal and receive reflected RF signals. Accordingly, the number of antennas in the antenna array can be reduced by half relative to embodiments in which separate transmit and receive antennas are required. Transmit antennas can be directional antennas used to transmit an RF signal. Similarly, receive antennas can be directional antennas used to receive reflected RF signals.

Embodiments of the invention include radar vehicular traffic sensors that use multiple radar beams to cover a (potentially wide) detection area and create position information within that detection area. Using a multiple radar beam system vehicle movements can be tracked as the vehicle position moves across the different beams.

FMCW RF radar systems can measure the range to the targets in the radar beam. Each beam in a multiple beam system can overlap to some extent with adjacent beams. In some embodiments, this results in there being no gaps in coverage. The system can measure the distance to targets in each of the beams.

Accordingly, in some embodiments, the range to the targets in each of the antenna beams is determined through the use of an FMCW RF signal. The angle to targets in a roadway can be determined through the use of the individual antennas in the antenna array. As a result, the range and angle can be determined for targets in a large portion of a roadway. From this information a two dimensional image of the roadway intersection can be constructed.

Figure 2A:
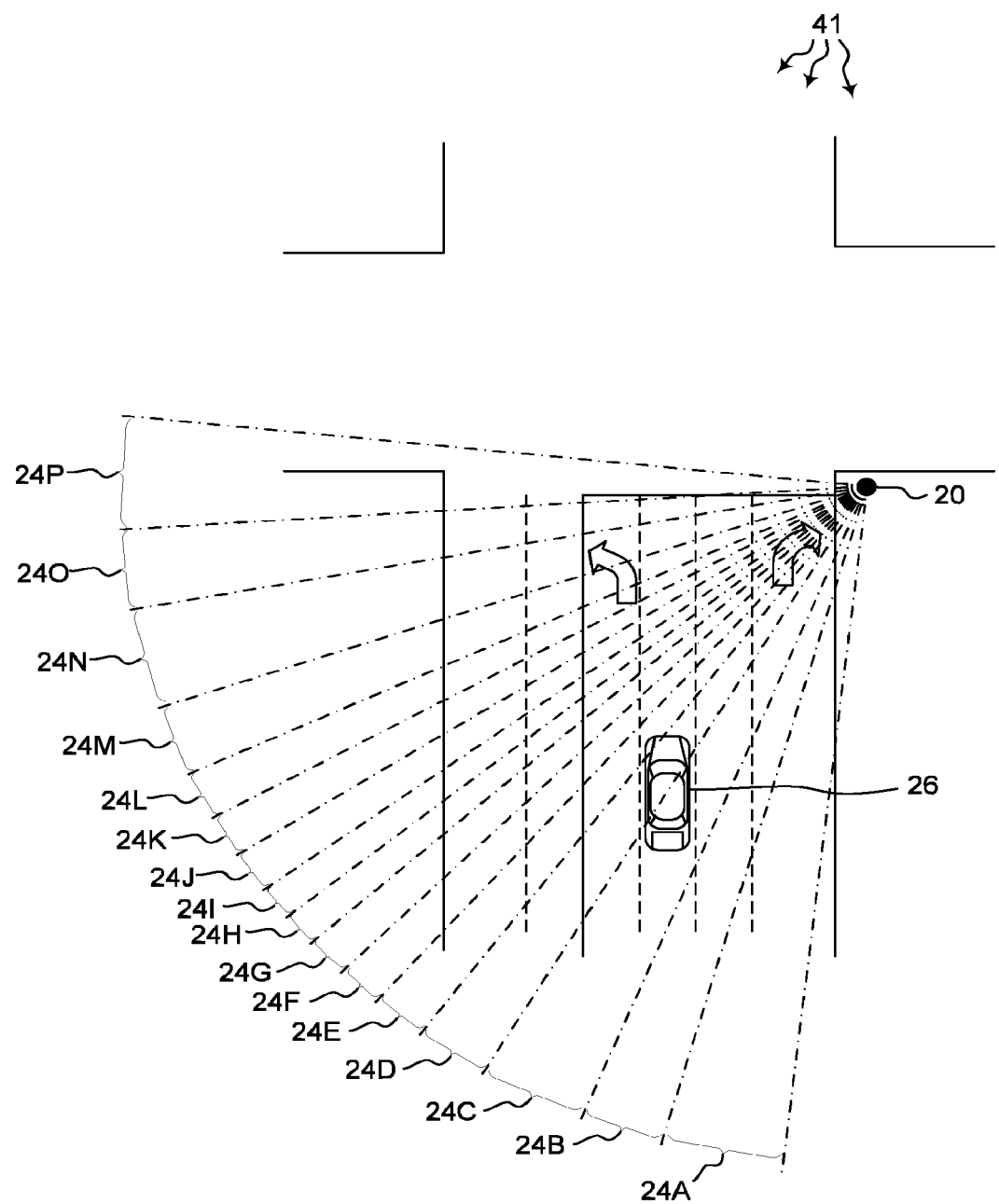
FIG. 2A illustrates the traffic sensor of FIG. 1 in a roadway intersection.

FIG. 2A depicts the traffic sensor 20 of FIG. 1 in a roadway intersection 41. Sensor 20 utilizes multiple antenna beams 24A-24P. Circuitry 11 can be configured to switch radar signal transmission between antenna beams 24A-24P on and off in sequence. Switching circuitry can control when each antenna beam is transmitting. A baseband multiplexer can control when a received (e.g., reflected) signal is processed for an antenna.

Processor 14 can measure the range to targets in each of the antenna beams 24A-24P. The range is the distance between sensor 20 and any targets, such as, for example, vehicle 26. Further, by using each of the antenna beams 24A-24P, sensor 20 can receive a radar return (e.g., a reflection off of vehicle 26) from multiple azimuth angles and can measure the range to the targets at each of the azimuth angles. The multiple azimuth angles can be measured in the horizontal plane. In this way, processor 14 can create a two dimensional image showing the location of the targets (e.g., vehicle 26) in and/or approaching intersection 41. Processor 14 can create an image using a two dimensional orthogonal coordinate system, such as, for example, a Cartesian coordinate system, a polar coordinate system, etc.

Figure 2B:
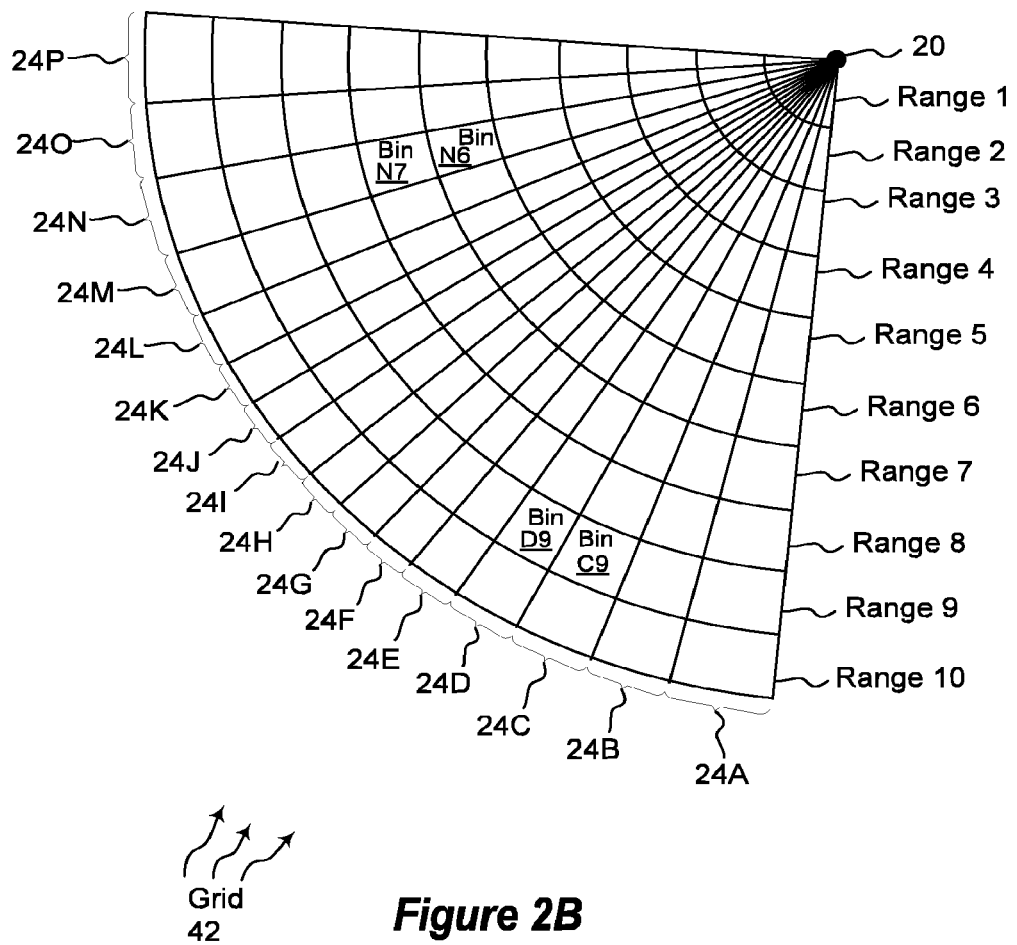
FIG. 2B illustrates the plurality of beams of the traffic sensor of FIG. 1 being divided into a grid range bins.

The plurality of beams in a multiple beam radar system can be divided in a grid of range bins. For example, FIG. 2B depicts the plurality of beams of sensor 20 within intersection 41. (However, the vehicles, intersection markings, and boundaries from FIG. 2A are removed for clarity). As depicted, beams 24A-24P are divided into a grid of range bins 42. Range bins in grid 42 are of uniform varied distance ranges from sensor 20. Each beam is divided into a plurality of range bins in accordance with the uniform varied distance ranges. The uniform varied distance ranges are identified as range 1 through range 10.

Within the description and following claims, a particular range bin in grid 42 can be identified by a combination of beam letter and range number so as to differentiate the particular range bin from other ranges bins in grid 42. As such, adjacent range bins in the same range can be differentiated by beam letter. For example, beam 24C and range 9 identify range bin C9 and beam 24D and range 9 identify bin D9. On the other hand, adjacent range bins in the same beam can be differentiated by range number. For example, beam 24N and range 6 identify range bin N6 and beam 24N and range 7 identify bin N7. Although not expressly depicted in the Figures, other range bins may be referred to using similar notations throughout this specification. For example, the range bin corresponding to beam 24G and range 2 can be referred to as range bin G2. Similarly, the range bin corresponding to beam 24L and range 6 can be referred to as range bin L6. However, other range bin notations are also possible.

Based on grid 42, sensor 20 can detect multi-beam images within returns (reflections) from targets in intersection 41. Multi-beam images can span a plurality of the beams 24A-24P. Multi-beam images can also span a plurality of range bins within gird 42. The magnitude of the energy reflected from a particular range bin can correspond to the amount of reflective area in the particular range bin. That is, when there is more reflective area in a range bin, the magnitude of energy detected in the range bin is likely to be greater. On the other hand, when there is less reflective area in a range bin, the magnitude of energy detected in the range bin is likely to be lower.

Thus, it may be that a larger portion of a vehicle is with the boundaries of a specified range bin of grid 42. As such, other smaller portions of the vehicle may be within the boundaries of one or more other range bins of 42. Thus, since a larger portion of the vehicle is in the specified range bin, the reflective area in the specified range bin is likely greater than the reflective area in any of the one or more other range bins. Accordingly, the magnitude of the identified energy from the specified range bin is also likely to be greater than the magnitude of the identified energy from the one or more other range bins.

Sensor 20 can use a magnitude threshold to determine when identified energy indicates a potential target. When the magnitude of identified energy from a range bin is greater than (or equal to) the magnitude threshold, sensor 20 can consider the identified energy as a potential target. On the other hand, when the magnitude of identified energy from a range bin is less than the magnitude threshold, sensor 20 does not consider the identified energy as a potential target.

When the magnitude of identified energy from a specified range bin indicates a potential target, sensor 20 can then determine whether or not the magnitude of identified energy from the specified range bin is an energy peak. That is, whether or not the magnitude of the specified range bin is greater than the magnitude of the identified energy in any surrounding adjacent range bins. In some embodiments, a target or at least a larger portion (or largest portion of) a target is assumed to be located in a range bin that is an energy peak.

Thus, when the magnitude of identified energy from the specified range is an energy peak, sensor 20 detects there to be a target present in the specified range bin. For example, a larger portion of a vehicle may be present within the boundaries of the specified range bin. On the other hand, when the magnitude of identified energy from the specified range bin is not an energy peak, sensor 20 considers there not to be a target present in the specified range bin. For example, a smaller portion of a vehicle may be present within the boundaries of the specified range bin (and thus a larger portion of the vehicle is likely present in one or more of the surrounding adjacent range bins).

When a target is detected (i.e., when the magnitude of identified energy in a specified range bin is greater than a threshold and greater than any surrounding adjacent range bins), sensor 20 can use the magnitude of the identified energy in the specified range bin and the magnitude of the energy in any surrounding adjacent range bins to compute the position of the target. In some embodiments, a two-dimensional Cartesian coordinate system is used to more precisely represent positions on a roadway. For example, a Cartesian coordinate system can be used to represent positions in intersection 41. As such, identified energy magnitudes from grid 42 can be used to calculate the position (e.g., X and Y coordinates) of targets in intersection 41.

Figure 2C:
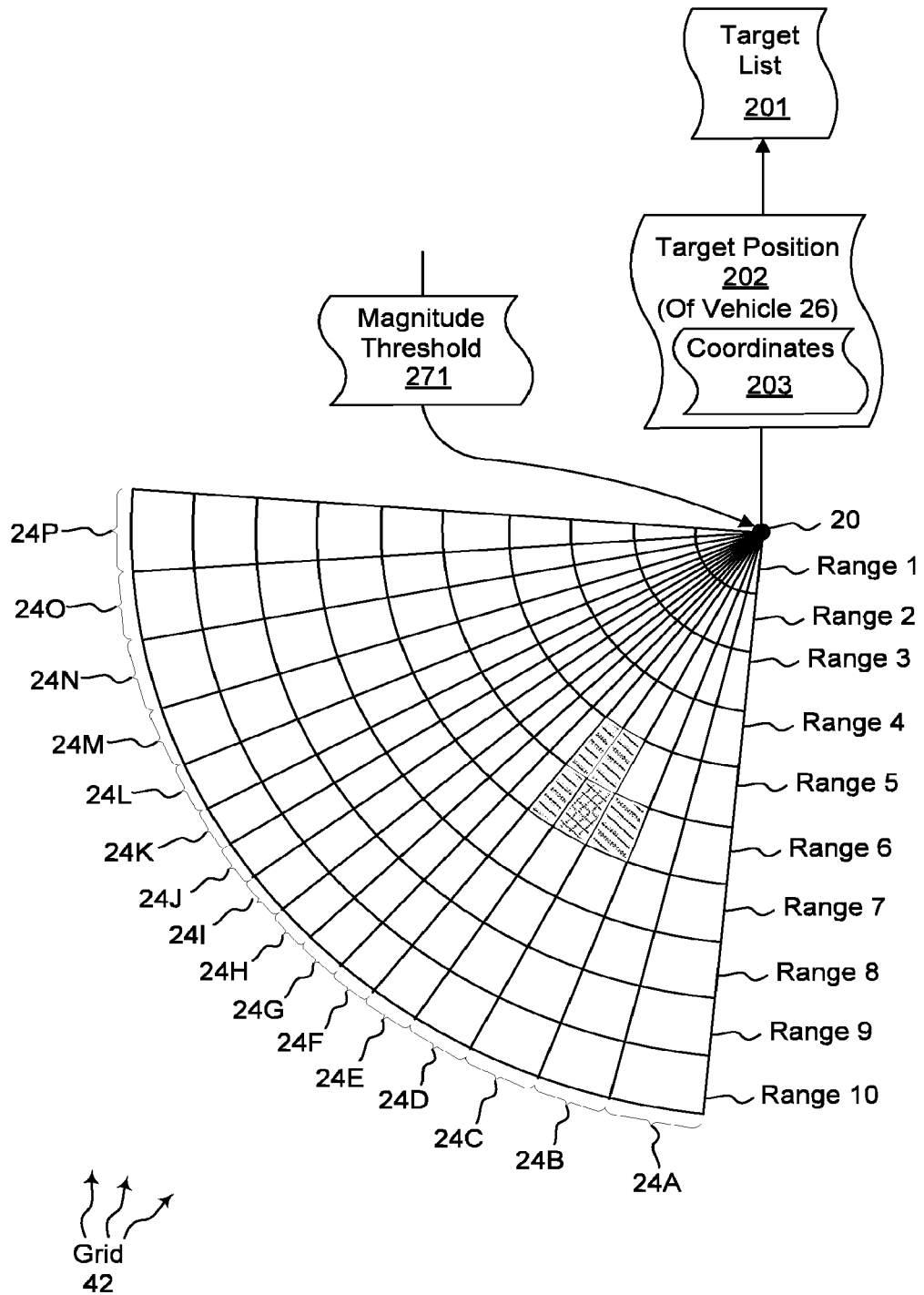
FIG. 2C illustrates a detected target within the plurality of beams of the traffic sensor of FIG. 1.
Figure 3:
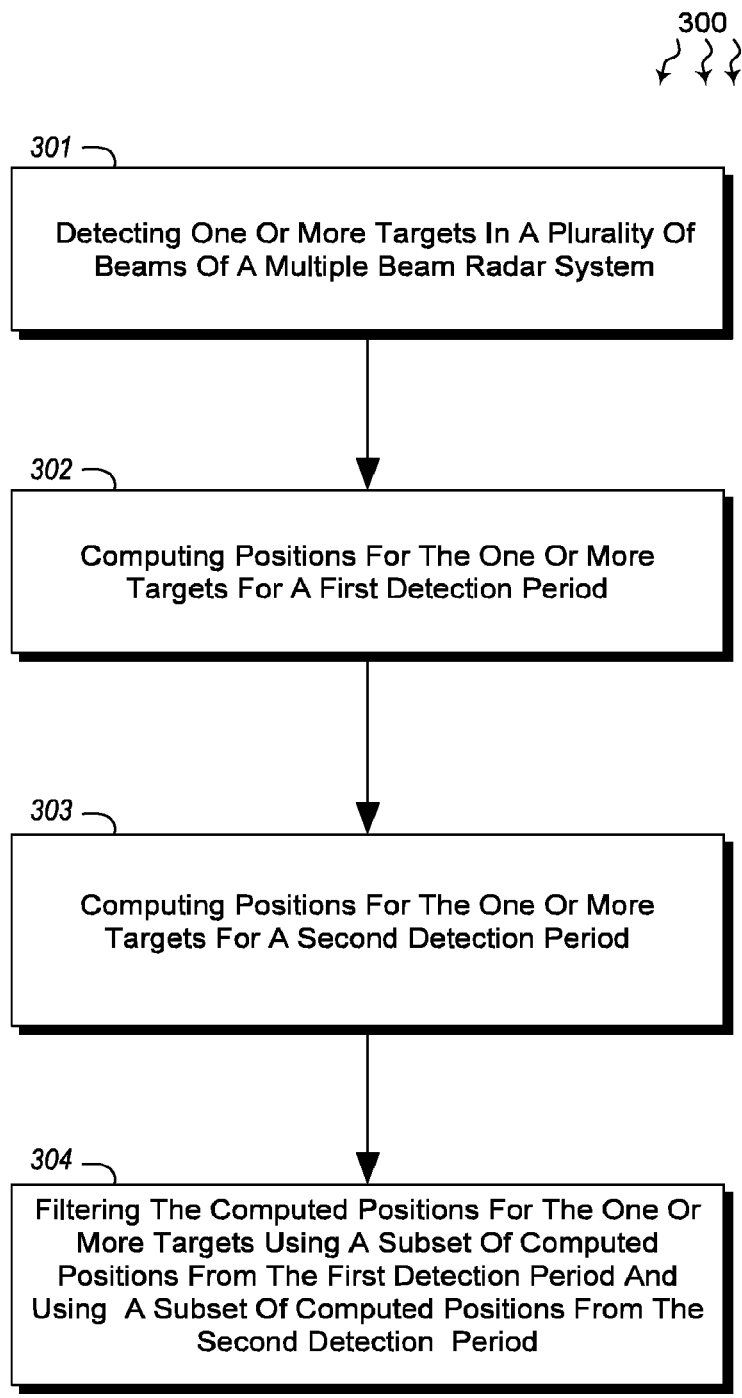
FIG. 3 illustrates an example flow chart of a method for filtering computed target positions across a plurality of beams of a multiple beam radar system in a roadway.

Turning to FIG. 2C, FIG. 2C depicts a detected target within the plurality of beams of the traffic sensor 20. FIG. 3 illustrates an example flow chart of a method 300 for filtering computed target positions across a plurality of beams of a multiple beam radar system in a roadway. The method 300 will be described primarily with respect to the data and components in FIGS. 2A-2C.

Figure 4A:
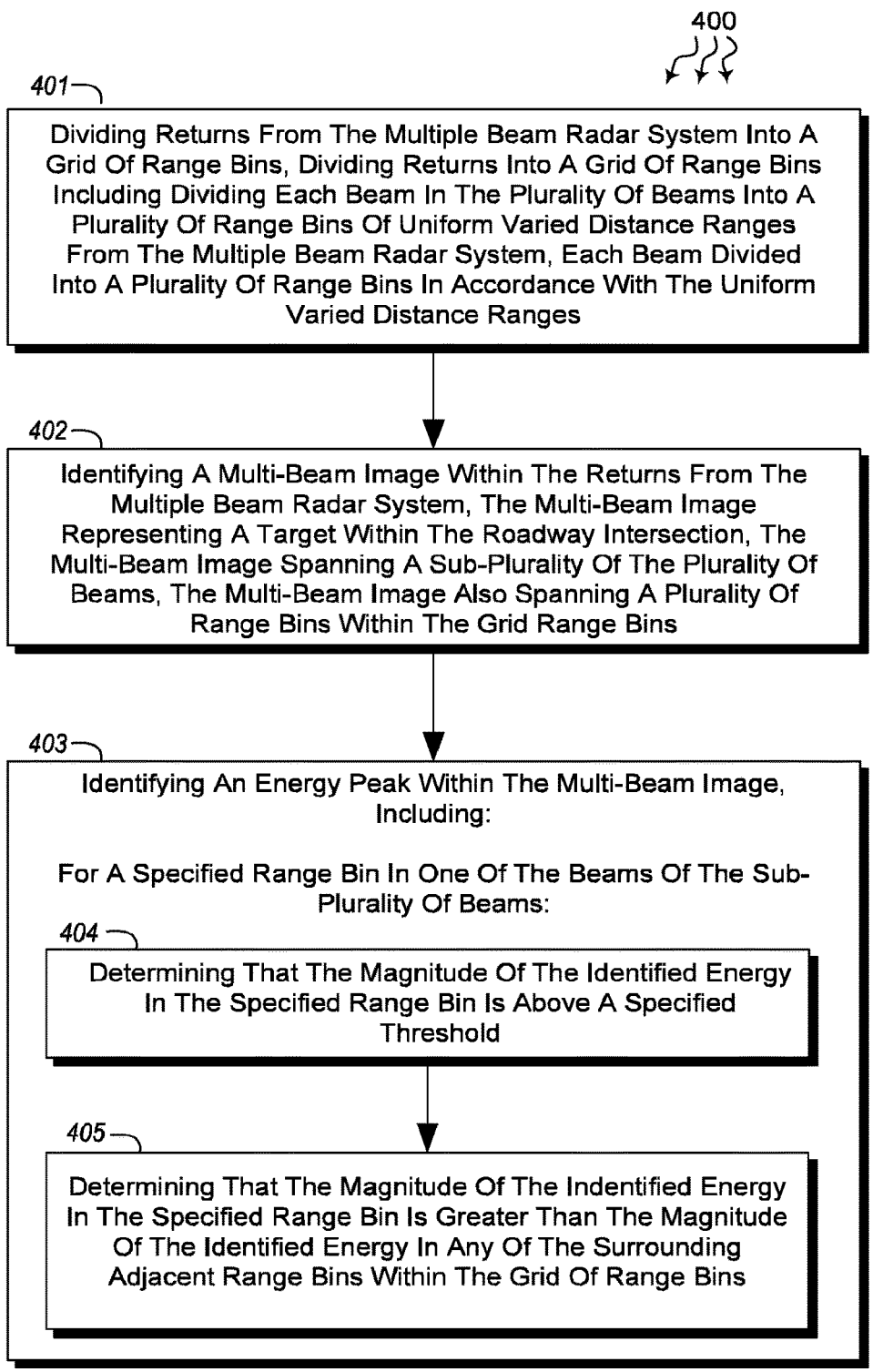
FIG. 4A illustrates an example flow chart of a method for detecting targets in a plurality of beams.
Figure 4B:
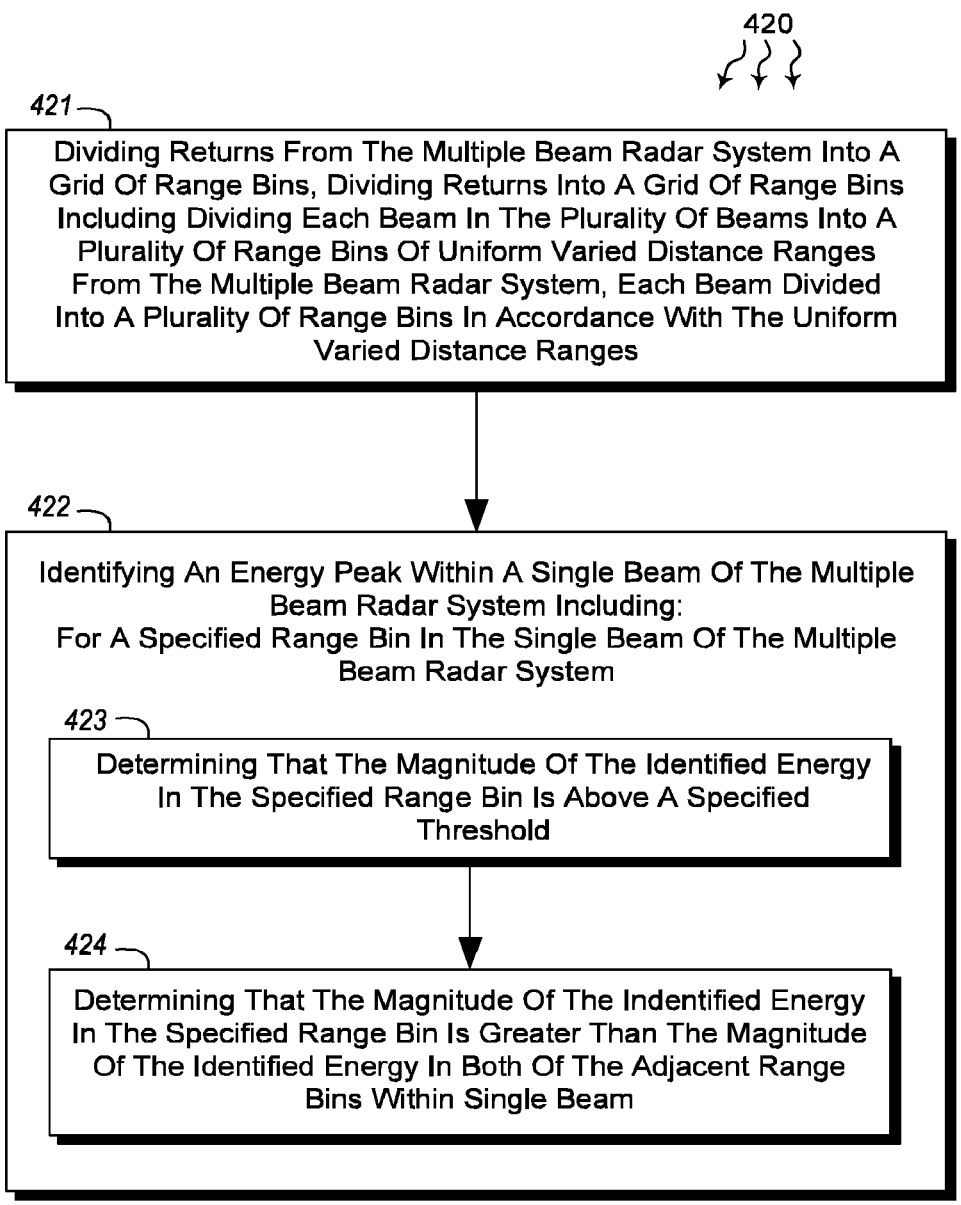
FIG. 4B illustrates an example flow chart of another method for detecting targets in a plurality of beams.
Figure 4C:
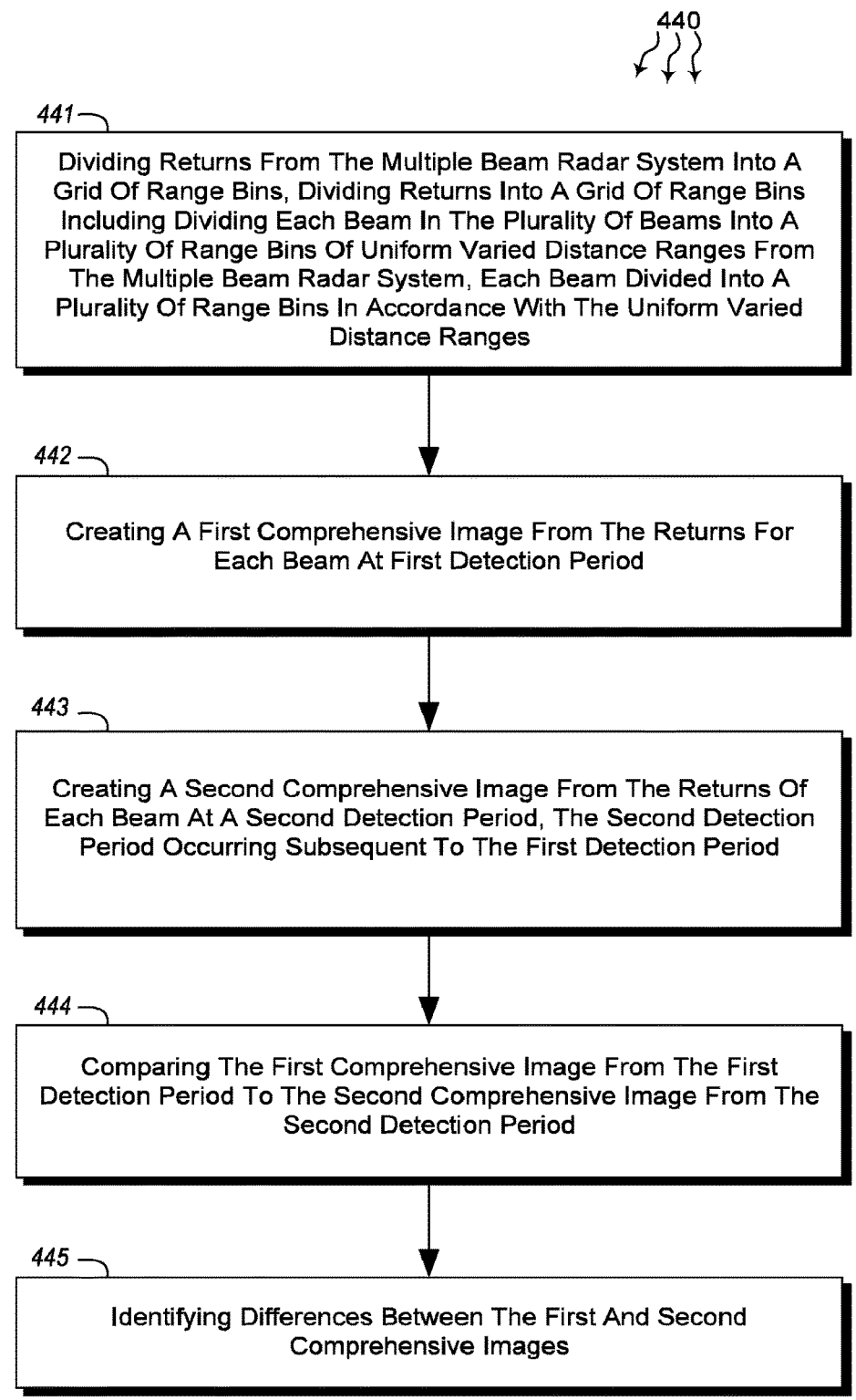
FIG. 4C illustrates an example flow chart of another method for detecting targets in a plurality of beams.

Method 300 includes an act of detecting one or more targets in a plurality of beams of a multiple beam radar system (act 301). For example, targets can be detecting in the plurality of beams of 24A-24P of sensor 20. Targets can be detected using a variety of different mechanisms. FIGS. 4A, 4B, and 4C illustrate example flow charts of methods for detecting targets in a plurality of beams of the multiple beam radar system. Any of the methods depicted in FIG. 4A, 4B, or 4C can be used to implement act 301. FIGS. 4A, 4B, and 4C will now be described after which the remaining acts of method 300 will be described.

More specifically, FIG. 4A illustrates an example flow chart of a method 400 for detecting targets in a plurality of beams. Method 400 will be described with respect to the elements depicted in FIGS. 2A-2C.

Method 400 includes an act of dividing returns from the multiple beam radar system into a grid of range bins, dividing returns into a grid of range bins including dividing each beam in the plurality of beams into a plurality of range bins of uniform varied distances from the multiple beam radar system, each beam divided into a plurality of range bins in accordance with the uniform varied distances (act 401). For example, as depicted in FIG. 2B, the returns (reflections) corresponding to beams of sensor 20 can be divided into grid 42.

Method 400 includes an act of identifying a multi-beam image within the returns from the multiple beam radar system, the multi-beam image representing a target within the roadway, the multi-beam image spanning a sub-plurality of the plurality of beams, the multi-beam image also spanning a plurality of range bins within the grid of range bins (act 402). For example, turning now to FIG. 2C, sensor 20 can detect an image that spans range bins E5, D5, E6, D6, and C6 (as indicted by the hatching within these range bins).

Method 400 includes an act of identifying an energy peak within the multi-beam image (act 403). For example, sensor 20 can identify an energy peak in range bin D6 (as indicated by cross-hatching in range bin D6). Identifying an energy peak can include for a specified range bin in one of the beams of the sub-plurality of beams, an act of determining that the magnitude of the identified energy in the specified range bin is above a specified threshold (act 404). Identifying an energy peak can also include for the specified range bin, an act of determining that the magnitude of the identified energy in the specified range bin is greater than the magnitude of the identified energy in any of the surrounding adjacent range bins within the grid of range bin (act 405).

For example, sensor 20 can measure the magnitude of identified energy in each range bin in grid 42 at specified intervals. For the identified energy magnitudes, sensor 20 can determine if any of the identified magnitudes are greater than (or equal to) a magnitude threshold. For example, as depicted in FIG. 2C, sensor 20 can determine that the magnitude of identified energy received from range bins D6 and E5 is greater than magnitude threshold 271. For each of range bins D6 and E5, sensor 20 compares the identified energy magnitude to the identified energy magnitude received from any surrounding adjacent range bins. For example, sensor 20 can compare the identified energy magnitude received form range bin D6 to the identified energy magnitudes received from range bins E5, D5, C5, E6, C6, E7, D7, and C7. Similarly, sensor 20 can compare the identified energy magnitude received from range bin E5 to the identified energy magnitudes receive from range bins F4, E4, C4, F5, C5, F6, E6, and D6.

From the comparison, sensor 20 can determine that the identified energy magnitude received from D6 is greater than identified energy magnitude received from any of its surrounding adjacent range bins. Sensor 20 can also determine that the identified energy magnitude received from E5 is not greater than identified energy magnitude received from any of its surrounding adjacent range bins. That is, the identified energy magnitude received from range bin D6 is greater than the identified energy magnitude received from range bin E5. As such, range bin D6 is identified as an energy peak. However, range bin E5 is not identified as an energy peak. Since range bins D6 and E5 are adjacent range bins, sensor 20 determines that the identified energy magnitude received from ranges bins D6 and E5 is likely from the same target (e.g., vehicle 26). Further, since identified energy magnitude received from range bin D6 is greater, sensor 20 determines that a larger portion of the target is in range bin D6. Thus, it is also likely that a smaller portion of the same target (e.g., vehicle 26) is in range bin E5.

Method 400 can be repeated as appropriate to identify other targets in intersection 41, as well as identifying new positions of existing targets in intersection 41. Thus, in some embodiments, an energy peak is identified within a multi-beam image to detect a target.

In other embodiments, detecting targets in a plurality of beams includes identifying an energy peak within a single beam of a multiple beam radar system to detect a target. For example, turning now to FIG. 4B, FIG. 4B illustrates an example flow chart of another method 420 for detecting targets in a plurality of beams. Method 420 will be described with respect to the elements depicted in FIGS. 2A-2C.

Method 420 includes an act of dividing returns from the multiple beam radar system into a grid of range bins, dividing returns into a grid of range bins including dividing each beam in the plurality of beams into a plurality of range bins of uniform varied distances from the multiple beam radar system, each beam divided into a plurality of range bins in accordance with the uniform varied distances (act 421). Act 421 can be performed similarly or even identical to act 401 from method 400.

Method 420 includes an act of identifying an energy peak within a single beam of the multiple beam radar system (act 422). For example, turning now to FIG. 2C, sensor 20 can detect an energy peak in beams 24C, 24D, and 24E.

Identifying an energy peak within a single beam can include for a specified range bin in one of the beams of the sub-plurality of beams, an act of determining that the magnitude of the identified energy in the specified range bin is above a specified threshold (act 423). Identifying an energy peak can also include for the specified range bin, an act of determining that the magnitude of the identified energy in the specified range bin is greater than the magnitude of the identified energy in both of the adjacent range bins (act 424). For example, in FIG. 2C range bin D6 is compared to range bin D5 and to range bin D7 and if the energy in D6 is greater than the energy in these bins then it is a peak.

Act 422 can be repeated for different beams within the multiple beam radar system and can be repeated at different points in time so that while each individual target is only detected in a single beam, the targets collectively are detected in a plurality of beams.

In further embodiments, detecting targets within a plurality of beams includes comparing differences between created comprehensive images. For example, turning now to FIG. 4C, FIG. 4C illustrates an example flow chart of another method 440 for detecting targets in a plurality of beams. Method 440 will be described with respect to the elements depicted in FIGS. 2A-2C.

Method 440 includes an act of dividing returns from the multiple beam radar system into a grid of range bins, dividing returns into a grid of range bins including dividing each beam in the plurality of beams into a plurality of range bins of uniform varied distances from the multiple beam radar system, each beam divided into a plurality of range bins in accordance with the uniform varied distances (act 441). Act 441 can be performed similarly or even identical to act 401 from method 400 or to act 421 from method 420.

Method 440 includes an act of creating a first comprehensive image from the returns for each beam at a first detection period (act 442). In some embodiments, creating a comprehensive image includes organizing divided returns for each of the beams of the multiple beam radar system into a block of memory. For example, sensor 20 can create a first comprehensive image by organizing divided returns for each of beams 24A-24P into a block of memory. The first comprehensive image can be created at a first detection period for sensor 20.

Method 440 includes an act of creating a second comprehensive image from the returns for each beam at a second detection period, the second detection period occurring subsequent to the first detected period (act 443). For example, sensor 20 can also create a second comprehensive image by organizing divided returns for each of beams 24A-24P into a block of memory. The second comprehensive image can be created at a second detection period for sensor 20. The second detection period for sensor 20 can occur after the first detection period for sensor 20.

Method 440 includes an act of comparing the first comprehensive image from the first detection period to the second comprehensive image from the second detection period (act 444). In some embodiments, the comparison includes subtracting the radar return for each range bin in each beam in the first comprehensive image from the radar return for each range bin in each beam in the second comprehensive image. For example, the radar return in each bin in grid 42 at a first time can be subtracted from the radar return in each bin of grid 42 at a second subsequent time to compare comprehensive images created by sensor 20.

Method 440 includes an act of identifying differences between the first and second comprehensive images (act 445). For example, sensor 20 can identify differences in returns in the bins of grid 42 over time. These differences can represent target detections. Act 445 can be repeated a number of times until targets in a comprehensive image are identified.

Thus as described, a variety of different mechanisms can be used to detect targets in a plurality of beams (e.g., in grid 42). Upon detecting targets in a plurality of beams, a variety of different computations can be performed based on the detected targets.

Referring now back to FIG. 3, Method 300 includes an act of computing positions for the one or more targets for a first detection period (act 302). For example, sensor 20 can detect the position of one or more targets (e.g., vehicle 26) in intersection 41 for a first detection period. Method 300 includes an act of computing positions for the one or more targets for a second detection period (act 303). For example, sensor 20 can detect the position of one or more targets (e.g., vehicle 26) in intersection 41 for a second (subsequent) detection period.

In some embodiments, target positions are computed based on the magnitude of the identified energy in the specified range bin and the magnitude of the identified energy in any of the surrounding adjacent range bins. For example, sensor 20 can compute target position 202 (of vehicle 26) from the identified energy magnitudes received from range bins E5, D5, C5, E6, D6, C6, E7, D7, and C7. Computed target position 202 can include coordinates 203 (e.g., x and y coordinates) indicating a two-dimensional position of vehicle 26 in intersection 41.

In some embodiments, centroid x and y coordinates are calculated in accordance with the following equation:

$$(x_{centroid}, y_{centroid}) = \frac{\sum_{n=1}^{N} (x_n, y_n) \cdot M_n}{\sum_{n=1}^{N} M_n}$$

where N=the number of range bins used in the centroid calculation. For range bins that are not on the edge of grid 42, N=9, the range bin of interest (a range bin having an energy peak) and the eight surrounding bins. $(x_n, y_n)$ represents the x and y coordinates of the center of the range bin. For side or corner range bins the value of N can differ. $M_n$ represents the identified energy magnitude received from the range bin.

A plurality of different positions for a target can potentially be computed. For example, for a target with spatial extent along a lane, the position of the foremost point along a lane and the position of the back most point along a lane could be computed.

Method 300 includes an act of filtering the computed positions for the one or more using a subset of computed positions from the first detection period and using a subset of computed positions from the second detection period (act 304). In some embodiments, filtering the computed positions includes both spatial and temporal filtering in which the computed target position is filtered in both position and in time. For example, sensor 20 can spatially and temporally filter computed target positions detected within grid 42.

Computed target positions will have errors that can be at least partially removed by filtering. For example, vehicles travel along paths dictated by the principles of velocity and acceleration. The computed positions, however, may have errors that could represent movements that would be impossible for a vehicle. These errors can be filtered out using a number of different methods.

One mechanism for spatially and temporally filtering is facilitated through the use of a track file. When maintaining a track file using a computed position from one detection period, the target may be detected in one beam of the multiple beam radar system as previously described. When the track file is maintained in another detection period, however, the target may be detected in a different beam of the multiple beam radar system. Thus, the track file has been maintained using the computed positions of targets in a plurality of beams even though in a single detection period the track file was maintained using computed positions of a target in a single beam.

In some embodiments, a target list is used to update track files for a roadway. When multiple targets are detected and multiple positions are computed in a single detection period, then the computed target positions are added to a target list.

Figure 6:
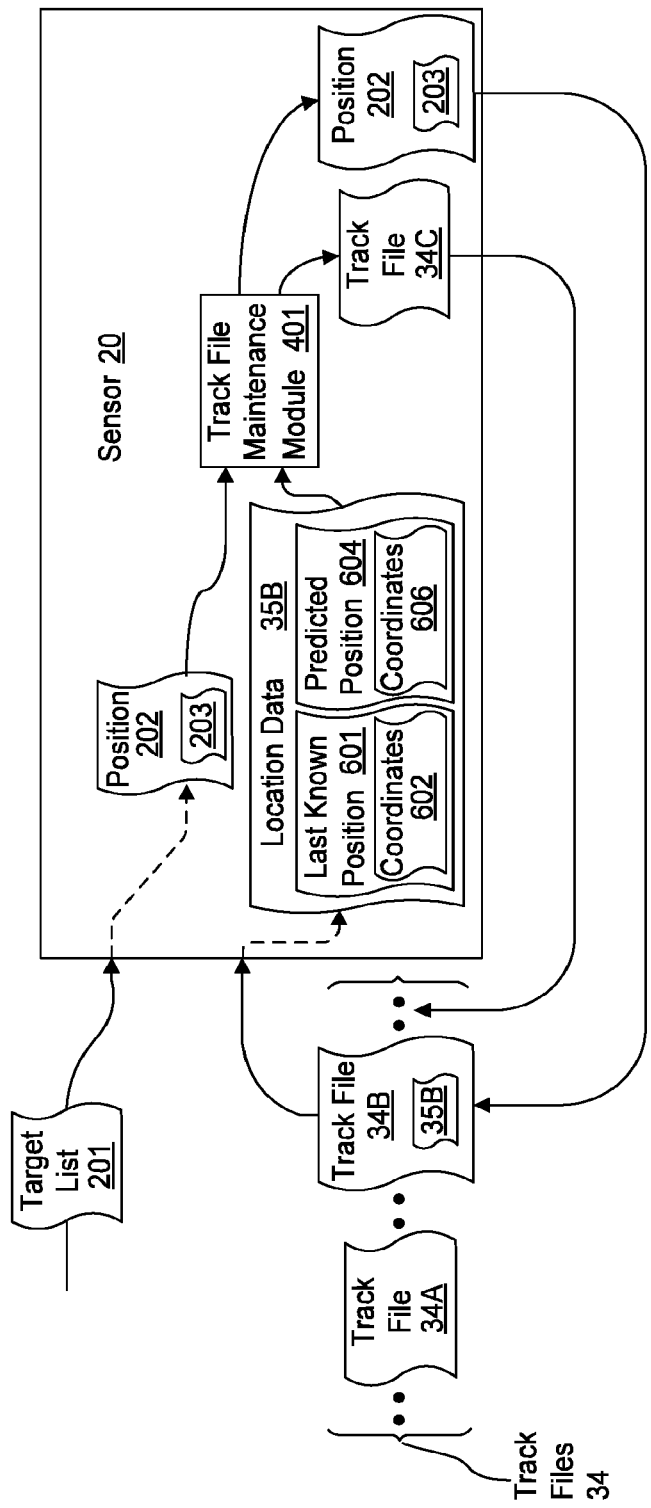
FIG. 6 illustrates a portion of traffic sensor infrastructure for updating track files for targets within a roadway intersection.

Turning now to FIG. 6, FIG. 6 illustrates a portion of traffic sensor 20 for updating track files 34 for targets within roadway intersection 41. As depicted, sensor 20 includes track file maintenance module 401. Track file maintenance module 401 is configured to access a target list and track files. From the target list and track files, track file maintenance module 401 determines if a computed target position in the target list corresponds to the position of a new target or to a new position of an existing target. For example, track file maintenance module 401 can access target list 201 and track files 34 and determine if computed target position 202 is the position of a new target in intersection 41 or computed target position 202 is a new position of an existing target in intersection 41.

Figure 5:
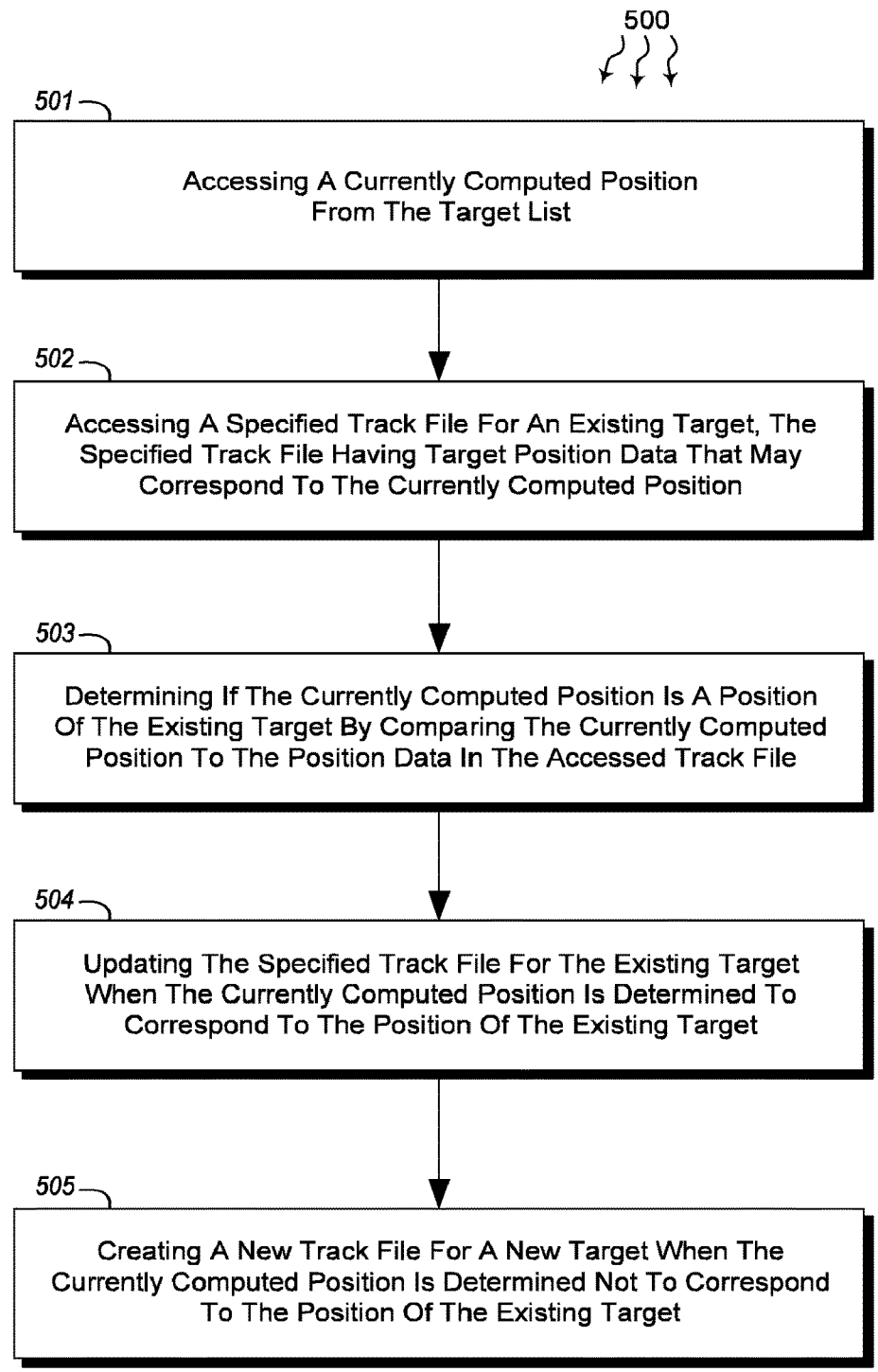
FIG. 5 illustrates an example flow chart of a method for performing filtering of computed target positions by maintaining a track file.

Turning back to FIG. 5, FIG. 5 illustrates an example flow chart 500 of a method for performing filtering by maintaining a track file. The method 500 will be described primarily with respect to the data and components in FIG. 6.

Method 500 includes an act of accessing a currently computed position from the target list (act 501). For example, track file maintenance module 401 can access computed position 202, including coordinates 203, from target list 201. Computed position 202 can indicate the position of a target in intersection 41

Method 500 includes an act of accessing a specified track file for an existing target, the specified track file having target position data that may correspond to the currently computed position (act 502). For example, track file maintenance module 401 can access one of track files 34. Each track file can include target data for a target that is within intersection 41. Target data can include target positioning data including at least one of: a last known position for the target and a predicted position for the target. For example, track file 34B can include target data 35B, including last known position 601 and predicted future position 604 for a target in intersection 41. Depending on an amount of time sensor 20 has been tracking a target, a predicted position may not be available, or may be more or less precise. For example, it may be difficult to predict a position for a target when sensor 20 has not tracked the target long enough to formulate a reasonable estimate of speed and/or direction for the target. Thus, as more information for a target is obtained, predictions of future positions can also become more precise.

For example, track file maintenance module 401 can access track file 34B for a target in intersection 41. Track file 34B can be selected due to having location data with a last known position and/or predicted location that is closer to computed position 202 than location data in other track files. Alternately, track file maintenance module 401 can access each track file 34 individually for comparison to computed position 202.

Method 500 includes an act of determining if the currently computed position is a position of the existing target by comparing the currently computed position to the position data in the accessed track file (act 503). For example, track file maintenance module 401 can determine if computed position 202 is a position of an existing target in roadway intersection 41 by comparing coordinates 203 to location data 35B.

In some embodiments, a computed position in a target list is compared to a last known position from a target. If the computed position in the target list is within a specified distance of a last known position, track file maintenance module 401 determines that the computed position from the target list is a new position for an existing target. For example, referring to FIG. 7A, FIG. 7A illustrates an example of determining whether or not a computed target position is the position of an existing target in a roadway.

Figure 7A:
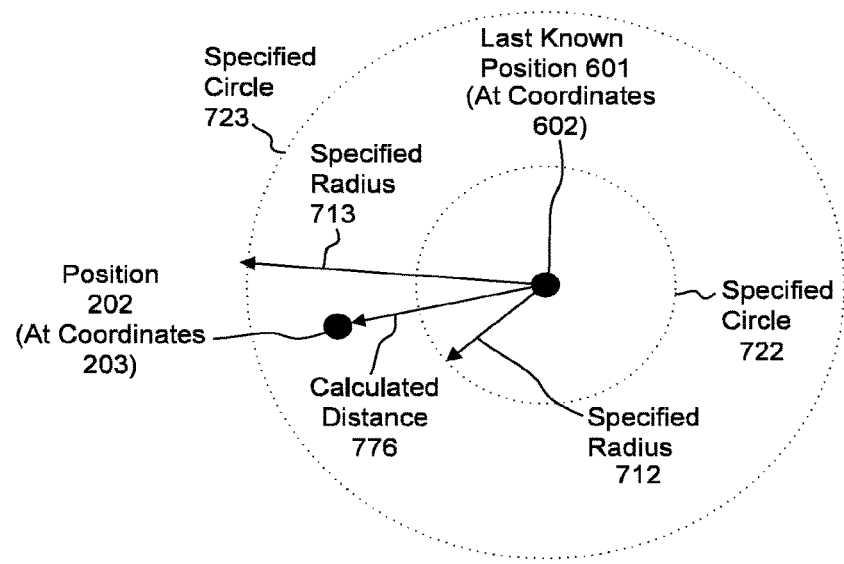
FIG. 7A illustrates an example of determining whether or not a computed target position corresponds to the position of an existing target in a roadway intersection.

As depicted in FIG. 7A, last known position 601 and computed position 202 are depicted some distance apart. Track file maintenance module 401 can calculate calculated distance 776 between last known position 601 and computed position 202 from coordinates 602 and coordinates 203 (e.g., both 602 and 203 being two-dimensional Cartesian coordinates). Track file maintenance module 401 can compare calculated distance 776 to a specified radius 713 to determine whether or not computed position 202 is a new position for the target previously detected at last known position 601. The specified radius 713 defines a circle (e.g., specified circle 723) that is centered at the last known position 601 and has the specified radius 713.

Thus, if the specified distance radius is specified radius 713, track file maintenance module 401 determines that computed position 202 is a new position for a target previously detected at last known position 601 in intersection 41 (i.e., calculated distance 776 is less than specified radius 713 and computed position 202 is within specified circle 723). On the other hand, if the specified distance is specified radius 712, track file maintenance module 401 determines that computed position 202 is the position of a new target in intersection 41 (i.e., calculated distance 776 is greater than specified radius 712 and computed position 202 is outside of specified circle 722).

In some embodiments, a computed position in a target list is compared to a predicted location for a target. If the computed position in the target list is within a specified distance radius of the predicted location, track file maintenance module 401 determines that the computed position from the target list corresponds to a new position for an existing target. For example, referring to FIG. 7B, FIG. 7B illustrates an example of determining whether or not a computed target position is the position of an existing target in a roadway intersection.

Figure 7B:
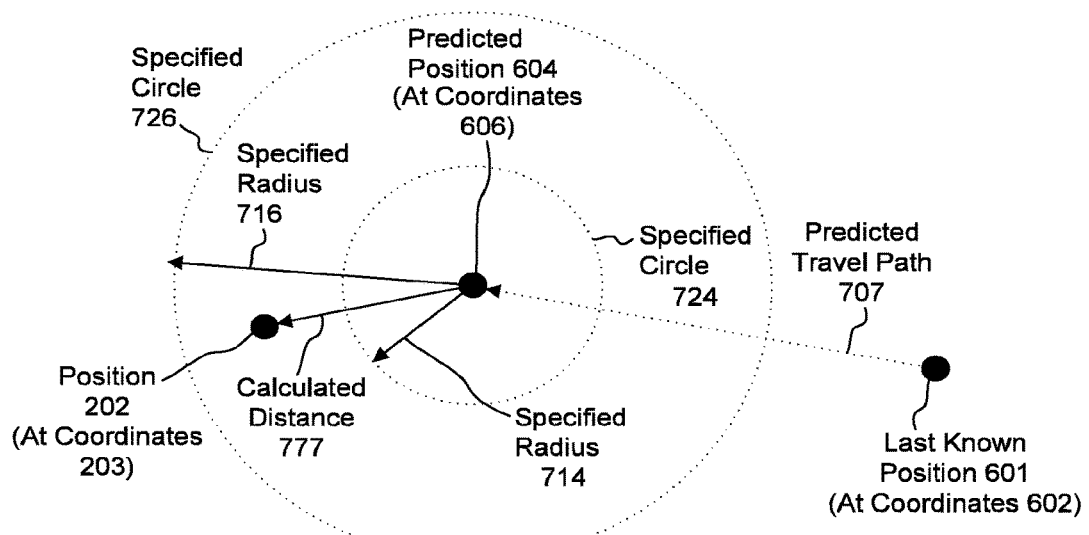
FIG. 7B another example of determining whether or not a computed target position corresponds to the position of an existing target in a roadway intersection.

As depicted in FIG. 7B, predicted position 604 and computed position 202 are depicted some distance apart. Predicted position 604 is derived from last known position 601 and predicted travel path 707 (e.g., the speed and direction of a target in intersection 41). Track file maintenance module 401 can calculate calculated distance 777 between predicted position 604 and computed position 202 from coordinates 606 and coordinates 203 (e.g., both 606 and 203 being two-dimensional Cartesian coordinates). Track file maintenance module 401 can compare calculated distance 777 to a specified distance radius to determine whether or not computed position 202 corresponds to a new position for the target previously detected at last known position 601.

Thus, if the specified distance radius is specified distance radius 716, track file maintenance module 401 determines that computed position 202 corresponds to a new position for the target previously detected at last known position 601 in intersection 41 (i.e., calculated distance 777 is less than specified radius 716 and computed position 202 is within specified circle 726). On the other hand, if the specified distance radius is specified radius 714, track file maintenance module 401 determines that computed position 202 corresponds to the position of a new target in intersection 41 (i.e., calculated distance 777 is greater than specified radius 714 and computed position 202 is outside of specified circle 724).

Turning back to FIG. 5, method 500 includes an act of updating the specified track file for the existing target when the currently computed position is determined to correspond to the position of the existing target (act 504). For example, track file maintenance module 401 can update location data 35B of track file 34B by filtering computed position 202 using either last known position 601 or predicted position 604 to result in a new last known position to be used in the next detection period. Method 500 also includes an act of creating a new track file for a new target when the currently computed position is determined not to correspond to the position of the existing target (act 505). For example, track file maintenance module 401 can create track file 34C (including computed position 202) for a new target in intersection 41.

Using track files to filter computed positions, which aids in the reduction of errors, can be done in many different ways. In some embodiments, a leaky integrator, also referred to as a single pole infinite impulse response (IIR) filter, is used to filter the computed positions. For example, when a position is computed that corresponds to a target with an existing track file, this computed position is combined with the last known position stored in the track file by weighting each of the values by the predetermined filter coefficients and then summing the two values. The result is used as the last known position for the next detection period as shown in the following equation:

$$P_i^{Last\ Known} = a_1 \cdot P_{i-1}^{Last\ Known} + b_0 \cdot P_i^{Computed}$$

wherein $$P_i^{Last\ Known}$$

is the value stored as the last known position for use in the next detection period, $$P_{i-1}^{Last\ Known}$$

is the last known position that was stored during the previous detection period, and $$P_i^{Computed}$$

is the newly computed target position, $a_1$ and $b_0$ are the predetermined filter coefficients.

In some embodiments, the computed position is filtered using the predicted position instead of the last known position. In these embodiments, the last known position is used to calculate the predicted position before the filtering is performed as shown in the following equations:

$$P_i^{Predicted} = v \cdot \Delta t + P_{i-1}^{Last\ Known}$$

$$P_i^{Last\ Known} = a_1 \cdot P_i^{Predicted} + b_0 \cdot P_i^{Compared}$$

wherein $$P_i^{Predicted}$$

is the predicted position that is calculated from the velocity of the target, v, and the time between detection periods, $\Delta t$. The velocity of the target can be estimated by calculating the change in position over time. Errors in this calculation can be reduced by averaging several measurements. For example, one method of calculating the velocity consists of averaging a predetermined number of calculated positions to create a first average position and then averaging a predetermined number of subsequent calculated positions to create a second average position. The velocity of the target can then be calculated by dividing the difference between the first and second average positions by the time required to create an average position.

Figure 8:
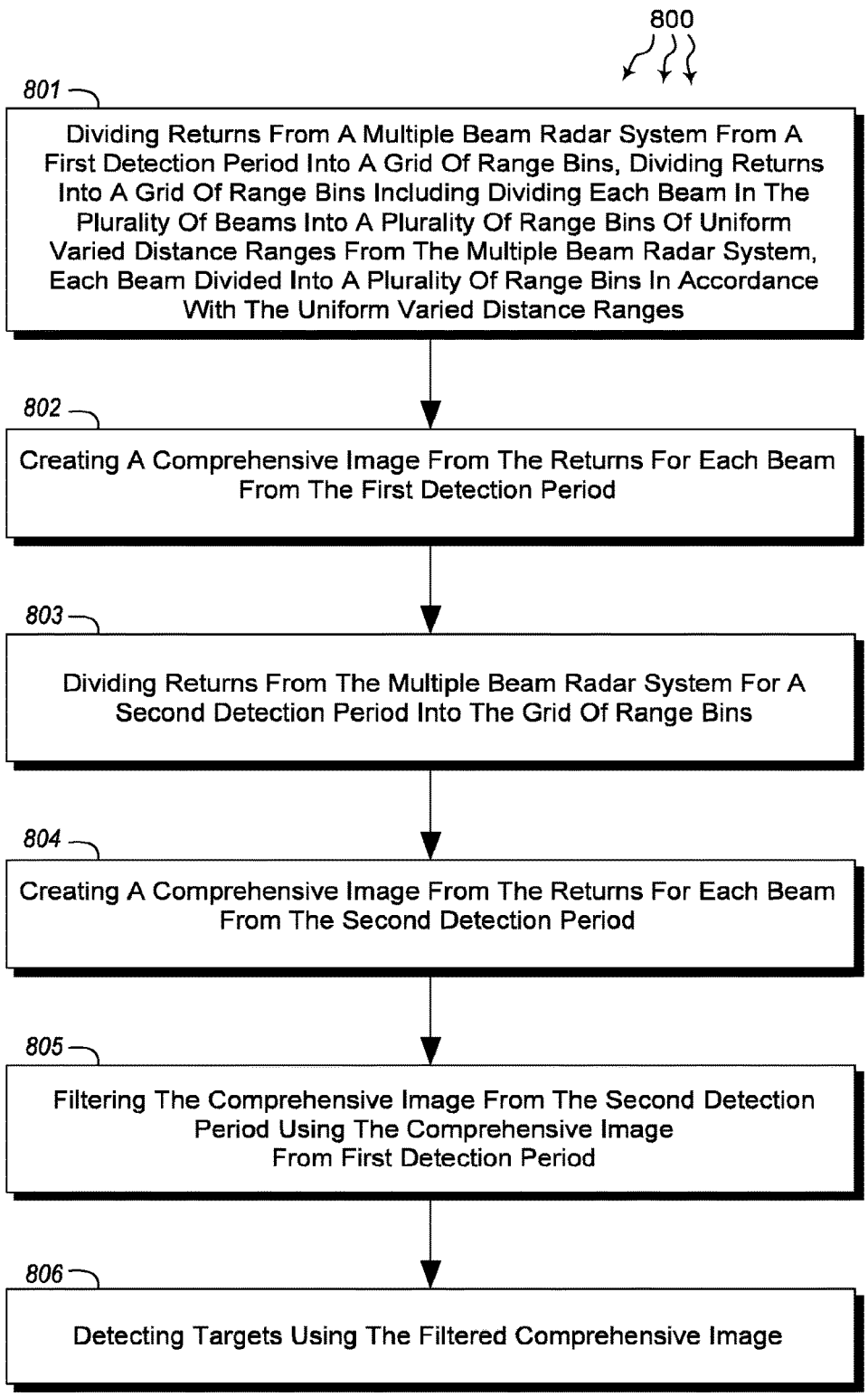
FIG. 8 illustrates an example flow chart of another method for filtering target positions across a plurality of beams of a multiple beam radar system in a roadway.

FIG. 8 illustrates an example flow chart of a method 800 for filtering target positions across a plurality of beams of a multiple beam radar system in a roadway.

Method 800 includes an act of dividing returns from a multiple beam radar system from a first detection period into a grid of range bins, dividing returns into a grid of ranges bins including dividing each beam in the plurality of beams in to a plurality of range bins of uniform varied distance ranges from the multiple beam radar system, each beam divided into a plurality of range bins in accordance with the uniform varied distance ranges (act 801). Act 801 can be performed similarly or even identical to act 401 from method 400, to act 421 from method 420, or act 441 from method 440 for a first detection period.

Method 800 includes an act of creating a comprehensive image from the returns for each beam from the first detection period (act 802). Act 802 can be performed similarly or even identical to acts 442 of method 440. For example, in some embodiments, creating a comprehensive image includes organizing the divided returns for each of the beams of the multiple beam radar system into a block of memory.

Method 800 includes an act of dividing returns from the multiple beam radar system for a second detection period into the grid of range bins (act 803). Act 803 can be performed similarly or even identical to act 401 from method 400, to act 421 from method 420, or act 441 from method 440 for a second detection period.

Method 800 includes an act of creating a comprehensive image from the returns for each beam from the second detection period (act 804). Act 804 can be performed similarly or even identical to acts 443 of method 440.

Method 800 includes an act of filtering the comprehensive image from the second detection period using a comprehensive image from the first detection period (act 805). In some embodiments, filtering is performed by filtering the radar return in each range bin and beam with the radar return in the corresponding range bin and beam from another comprehensive image. Method 800 includes an act of detecting targets using the filtered comprehensive image (act 806). Targets can be detected similarly or even identical to the detection mechanisms described in methods 400, 420, and 440.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for detecting targets in a plurality of beams generated by a multiple beam radar system, the method comprising:
    dividing one or more returns from the multiple beam radar system into a grid of range bins, including dividing each beam in the plurality of beams into a plurality of range bins of uniform varied distances from the multiple beam radar system, each beam being divided into a plurality of range bins in accordance with the uniform varied distances;
    identifying a multi-beam image within the returns from the multiple beam radar system, the multi-beam image representing a target within a roadway, the multi-beam image spanning a sub-plurality of the plurality of beams, the multi-beam image also spanning a plurality of range bins within the grid of range bins;
    identifying an energy peak within the multi-beam image; and
    for a specified range bin in one of the beams of the sub-plurality of beams,
        determining that the magnitude of the identified energy peak in a specified range bin is above a specified threshold; and
        determining that the magnitude of the identified energy in the specified range bin is greater than the magnitude of the identified energy in any surrounding adjacent range bin within the grid of range bins.

2. The method of claim 1, wherein the returns comprise reflections that correspond to beams of a specified sensor within the multiple beam radar system.

3. The method of claim 2, wherein the specified sensor is configured to detect an image that spans the plurality of range bins.

4. The method of claim 2, wherein the specified sensor is configured to measure the magnitude of identified energy in each range bin in the grid of range bins at specified intervals.

5. The method of claim 1, wherein upon determining that the magnitude of the identified energy in the specified range bin is above a specified threshold and is greater than the magnitude of the identified energy in any surrounding adjacent range bin within the grid of range bins, indicating that the identified energy peak represents a target on the roadway.

6. The method of claim 5, further comprising providing an indication of coordinates for the target identified in the roadway.

7. The method of claim 5, wherein determining that the identified energy in the specified range bin is greater than the magnitude of the identified energy in any surrounding adjacent range bin within the grid of range bins comprises comparing the magnitude of identified energy in the specified range bin to each measured magnitude of identified energy in those range bins that are adjacent to the specified range bin.

8. The method of claim 7, further comprising:
    determining that an energy peak is detected in a plurality of range bins;
    determining that the plurality of range bins are adjacent;
    determining that the identified energy magnitude received from the adjacent ranges bins is from the same target.

9. The method of claim 8, further comprising:
    determining that the identified energy magnitude received from a specified range bin is greater than the identified energy magnitude in the adjacent range bin; and
    determining that a larger portion of the target is in the specified range bin.

10. The method of claim 8, further comprising:
    determining that the identified energy magnitude received from a specified range bin is greater than the identified energy magnitude in the adjacent range bin; and
    determining that a smaller portion of the same target is in the adjacent range bin.

11. A traffic control system comprising:
    a traffic sensor for monitoring a roadway, the traffic sensor comprising:
        a multiple beam radar system including a plurality of beams and configured to transmit a signal into the roadway and to receive reflections of the signal off of objects in the roadway using the plurality of beams; and
        a computer system coupled to the radar system and configured to:
            divide returns from the multiple beam radar system into a grid of range bins, including dividing each beam in the plurality of beams into a plurality of range bins of uniform varied distances from the multiple beam radar system, each beam being divided into a plurality of range bins in accordance with the uniform varied distances; and
            identify an energy peak within a single beam of the multiple beam radar system, including, for a specified range bin in one of the beams of the sub-plurality of beams,
                determine that the magnitude of the identified energy in the specified range bin is above a specified threshold; and
                determine that the magnitude of the identified energy in the specified range bin is greater than the magnitude of the identified energy in each of the adjacent range bins.

12. The traffic control system recited in claim 11, wherein identifying the energy peak includes comparing identified energy in the specified range to identified energy in one or more adjacent range bins.

13. The traffic control system recited in claim 11, wherein the step of identifying an energy peak within a single beam of the multiple beam radar system is repeated for different beams within the multiple beam radar system.

14. The traffic control system recited in claim 11, wherein the step of identifying an energy peak within a single beam of the multiple beam radar system is repeated at different points in time, such that while each individual target is only detected in a single beam, the targets collectively are detected in a plurality of beams.

15. The traffic control system recited in claim 11, wherein the traffic control device is configured to actuate a traffic signal based on input from the traffic sensor.

16. A method for detecting targets in a plurality of beams generated by a multiple beam radar system, the method comprising:
 dividing one or more returns from the multiple beam radar system into a grid of range bins, including dividing each beam in the plurality of beams into a plurality of range bins of uniform varied distances from the multiple beam radar system, each beam being divided into a plurality of range bins in accordance with the uniform varied distances;
 creating a first comprehensive image from the returns for each beam at a first detection period;
 creating a second comprehensive image from the returns for each beam at a second detection period, the second detection period occurring subsequent to the first detected period;
 comparing the first comprehensive image from the first detection period to the second comprehensive image from the second detection period; and
 identifying differences between the first and second comprehensive images.

17. The method of claim 16, wherein identifying differences between the first and second comprehensive images includes identifying targets on a roadway.

18. The method of claim 17, wherein comparing the first comprehensive image from the first detection period to the second comprehensive image from the second detection period comprises subtracting a radar return for each range bin in each beam in the first comprehensive image from a radar return for each range bin in each beam in the second comprehensive image.

19. The method of claim 18, wherein a sensor that is part of the multiple beam radar system identifies differences in returns in the range bins of the grid of range bins over a specified period of time, the differences representing target detections.

20. The method of claim 16, wherein the step of identifying differences between the first and second comprehensive images is repeated a specified number of times until targets in the comprehensive image are identified.

21. A traffic sensor for monitoring a roadway, the traffic sensor comprising:
 a multiple beam radar system including a plurality of beams and configured to transmit signals into a roadway and to receive reflections of signals reflected off of objects in the roadway using the plurality of beams; and
 a computer system coupled with the multiple beam radar system and configured to:
  divide one or more returns from the multiple beam radar system into a grid of range bins, including dividing each beam in the plurality of beams into a plurality of range bins of uniform varied distances from the multiple beam radar system, each beam being divided into a plurality of range bins in accordance with the uniform varied distances;
  identify a multi-beam image within the returns from the multiple beam radar system, the multi-beam image representing a target within a roadway, the multi-beam image spanning a sub-plurality of the plurality of beams, the multi-beam image also spanning a plurality of range bins within the grid of range bins;
  identify an energy peak within the multi-beam image; and
 for a specified range bin in one of the beams of the sub-plurality of beams,
  determine that the magnitude of the identified energy peak in a specified range bin is above a specified threshold; and
  determine that the magnitude of the identified energy in the specified range bin is greater than the magnitude of the identified energy in any surrounding adjacent range bin within the grid of range bins.

22. The traffic sensor of claim 21, wherein the returns comprise reflections that correspond to beams of a specified sensor within the multiple beam radar system, the specified sensor being configured to detect an image that spans the plurality of range bins.

23. The traffic sensor of claim 22, wherein the specified sensor is configured to measure the magnitude of identified energy in each range bin in the grid of range bins at specified intervals.

* * * * *